US005210617A

United States Patent [19]

Tomiyama et al.

[11] Patent Number: 5,210,617

[45] Date of Patent: May 11, 1993

[54] DEVELOPER FOR DEVELOPING ELECTROSTATIC IMAGES AND IMAGE FORMING APPARATUS

[75] Inventors: Koichi Tomiyama, Kawasaki; Tsuyoshi Takiguchi, Yokohama; Tsutomu Kukimoto, Tokyo; Hiroshi Yusa, Yokohama; Eiichi Imai, Narashino, all of Japan

[73] Assignee: Canon Kabushiki Kaisha, Tokyo, Japan

[21] Appl. No.: 894,579

[22] Filed: Jun. 5, 1992

Related U.S. Application Data

[62] Division of Ser. No. 557,757, Jul. 26, 1990, Pat. No. 5,139,914.

[30] Foreign Application Priority Data

| | | | |
|---|---|---|---|
| Jul. 28, 1989 | [JP] | Japan | 1-194011 |
| Jul. 28, 1989 | [JP] | Japan | 1-194012 |
| Jul. 28, 1989 | [JP] | Japan | 1-194023 |
| Jul. 28, 1989 | [JP] | Japan | 1-194027 |
| Nov. 30, 1989 | [JP] | Japan | 1-309241 |
| Dec. 22, 1989 | [JP] | Japan | 1-331300 |

[51] Int. Cl.$^5$ ..... H04N 1/29

[52] U.S. Cl. ..... 358/300; 355/259

[58] Field of Search ..... 358/300; 355/259

[56] References Cited

U.S. PATENT DOCUMENTS

| | | | |
|---|---|---|---|
| 3,909,258 | 9/1975 | Kotz | 96/1 R |
| 4,816,365 | 3/1989 | Ishikawa . | |
| 4,837,101 | 6/1989 | Gruber et al. . | |
| 4,891,294 | 1/1990 | Noguchi | 430/111 |
| 4,933,251 | 6/1990 | Ichimura et al. | 430/111 |

FOREIGN PATENT DOCUMENTS

| | | |
|---|---|---|
| 207628 | 7/1987 | European Pat. Off. . |
| 2611281 | 8/1988 | France . |
| 46-5782 | 12/1971 | Japan . |
| 48-47345 | 7/1973 | Japan . |
| 48-47346 | 7/1973 | Japan . |
| 50-13661 | 2/1975 | Japan . |
| 54-42141 | 4/1979 | Japan . |
| 55-18656 | 2/1980 | Japan . |
| 60-186854 | 9/1985 | Japan . |
| 1-112253 | 4/1989 | Japan . |

OTHER PUBLICATIONS

Pat. Abstracts of Japan, vol. 14, No. 363 (P-918) (3711), Aug. 14, 1989 (Konica Corp.).

Pat. Abstracts of Japan, vol. 5, No. 22 (P-74) (794), Aug. 7, 1981 (Canon K.K.).

*Primary Examiner*—John Goodrow

*Attorney, Agent, or Firm*—Fitzpatrick, Cella, Harper & Scinto

[57] ABSTRACT

A developer for developing electrostatic latent images is constituted by a toner, and negatively chargeable spherical resin particles having an average particle size of 0.03–1.0 micron and a volume resistivity of $10^6$–$10^{12}$ ohm.cm. The toner may comprise toner particles and hydrophobic inorganic fine powder, which is generally used in a larger amount than the negatively chargeable spherical resin particles. The negatively chargeable spherical resin particles function to provide a toner image which is faithful to an electrostatic latent image formed on a photosensitive member while preventing toner-sticking onto the photosensitive member preferably in combination with a contact-charging means for charging the photosensitive member.

83 Claims, 4 Drawing Sheets

DEVELOPER FOR DEVELOPING ELECTROSTATIC IMAGES AND IMAGE FORMING APPARATUS

This application is a division of application Ser. No. 07/557,757 filed Jul. 26, 1990 now U.S. Pat. No. 5,139,914.

FIELD OF THE INVENTION AND RELATED ART

The present invention relates to a developer and an image forming system for visualizing electrostatic images in image forming methods, such as electrophotography, electrostatic recording, and electrostatic printing.

More particularly, the present invention relates to a developer and an image forming system used in a type of electrophotography including a charging step wherein a member is charged by causing a charging member externally supplied with a voltage to contact the member to be charged.

Hitherto, a corona discharger has been used as a charging means in electrophotographic apparatus. The corona discharger presents a problem in that it requires application of a high voltage to generate a large amount of ozone.

Recently, use of use a contact charging means instead of a corona discharger has been studied. More specifically, it has been proposed to cause a conductive roller as a charging means to contact a member to be charged such as a photosensitive member while applying a voltage to the conductive roller thereby to charge the member to be charged to a prescribed surface potential. By using such a contact charging means, it becomes possible to use a lower voltage than used by a corona discharger to thereby decrease the generation of ozone.

For example, Japanese Patent Publication JP-B Sho 50-13661 discloses the use of a roller comprising a metal core coated with a dielectric of nylon or polyurethane rubber to charge a photosensitive paper by application of a low voltage.

In the above embodiment, however, the roller comprising a metal core coated with nylon lacks a resilience like that of rubber so that it can fail to maintain a sufficient contact with the member to be charged, thus providing an insufficient charge. On the other hand, in a roller comprising a metal core coated with polyurethane rubber, a softening agent impregnating the rubber gradually exudes out so that, if the member to be charged is a photosensitive member, the charging member is liable to stick to the photosensitive member at the abutting part when the photosensitive member is stopped or the photosensitive member is liable to cause fading of images at the abutting part. Further, if the softening agent in the rubber material constituting the charging member exudes out and adheres to the photosensitive member surface, the photosensitive member is caused to have a lower resistivity to cause image flow. The photosensitive member may even become inoperable or cause sticking of residual toner on the photosensitive member to the surface of the charging member, thus leading to filming. If a large amount of toner sticks to the surface of the charging member, the surface of the charging member locally loses its chargeability to charge the photosensitive member surface nonuniformity, thus adversely affecting the resultant toner images. This is because the residual toner is strongly pushed by the charging member against the photosensitive member surface, so that the residual toner is liable to stick to the surfaces of the charging member and the photosensitive member to mar or scratch the photosensitive member surface.

In a contact charging apparatus, the charging member is supplied with a DC voltage or a DC voltage superposed with an AC voltage. In this instance, in the region or therearound of contact between the charging member and the photosensitive drum, there frequently occur abnormal charging and repetitive discharge of residual toner particles having a small diameter and a small weight Accordingly, the residual toner is liable to be electrostatically adsorbed by or embedded in the surfaces of the charging member and photosensitive drum. This is very different from a case where a non-contact charging means is used as in a conventional corona discharger.

On the other hand, there have been used small-sized and inexpensive copying machines for personal use and laser beam printers in recent years. In these small-sized apparatus, it is desirable to use a cartridge integrally including a photosensitive member, a developing means, a cleaning means, etc., so as to provide a maintenance-free system. It is also desirable to use a single-component, dry, magnetic developer so as to simplify the structure of the developing means.

The processes using magnetic toners may for example include: the magne-dry process using an electro-conductive toner disclosed in U.S. Pat. No. 3,909,258, a process utilizing dielectric polarization of toner particles; a process utilizing charge transfer by agitation with a toner; developing processes wherein toner particles are caused to jump onto latent images as disclosed in JP-A 54-42141 and JP-A 55-18656; etc.

In order to form visible images of good image quality in such processes using a dry magnetic developer, the developer is required to have a high fluidity and a uniform chargeability, so that it has been conventionally practiced to add silicic acid fine powder to toner particles. Silicic acid fine powder (i.e., silica powder) per se is hydrophilic, so that a developer containing the silica added thereto agglomerates due to moisture in the air to lower its fluidity or even lower its chargeability due to moisture absorption by the silica. For this reason, it has been proposed to use hydrophobicity-imparted silica powder by JP-A 46-5782, JP-A 48-47345, JP-A 48-47346, etc. More specifically, there has been used hydrophobic silica obtained, e.g., by reacting silica powder with an organic silicon compound, such as dimethyldichlorosilane, to substitute an organic group for silanol groups on the surfaces of the silica particles.

In a magnetic toner, the magnetic toner per se shows an abrasive function. In an image forming step wherein a developer is pressed against a photosensitive member having a low surface-hardness such as an organic photoconductor (OPC) member, if the developer comprises a mixture of a magnetic toner and inorganic fine powder, several difficulties are liable to be encountered, such as white dropout in developed images due to scraping of the surfaces of both the pressing member and the photosensitive member, damage to the pressing member and photosensitive member, and soiling or contamination of the photosensitive member, such as melt-sticking and filming of the toner.

It has been proposed to add polymer particles smaller than toner particles by JP-A 60-186854, etc. When we prepared a developer according to such teaching, the resultant developer was not effective against toner sticking but was liable to cause charge irregularity in a contact charging apparatus.

On the other hand, in accordance with remarkable increases in capacity of host computers, a laser beam printer showing a high printing speed has been required. Further, an image forming apparatus free from ozone generation is desired in respect of an office environmental condition.

In contact charging, an increased voltage and an increased AC frequency are required so as to stably charge the photosensitive member in accordance with the process speed, which also promotes sticking of the developer onto the photosensitive member.

In recent years, more severe requirements have been imposed on image qualities, and it is required to visualize even an extremely fine latent image faithfully without resolving failure such as solidification or discontinuity. Accordingly, there is a trend to use a smaller particle size of toner. For example, JP-A Hei 1-112253 has proposed a developer having a volume-average particle size of 4–9 microns.

A decrease in particle size of toner is generally accompanied with an increase in specific surface area thereof, so that such a toner is liable to soil or contaminate the pressing member and photosensitive member and also requires a larger amount of inorganic fine powder so as to ensure a sufficient fluidity in compensation for the increase in agglomeration characteristic. As a result, there is a tendency to promote image defects, such as white dropout due to scraping of the pressing member and photosensitive member, and sticking and filming of toner due to damage to the pressing member and photosensitive member.

SUMMARY OF THE INVENTION

An object of the present invention is to provide a developer for developing electrostatic images which is free from toner sticking or only accompanied with suppressed toner sticking, if any.

An object of the present invention to provide a developer and an image forming apparatus providing toner images which show a high density and are free from fog.

An object of the present invention is to provide a developer which hardly contaminates a contact charging apparatus.

An object of the present invention is to image forming apparatus wherein charge irregularities onto a photosensitive member by a contact charging means are suppressed.

An object of the present invention is to provide a developer which can stably form visible images which are faithful to latent images, sharp and of high densities.

An object of the present invention is to provide a practical image forming apparatus including a contact charging means and a developing means for effecting development with the developer by the present invention.

According to the present invention, there is provided a developer for developing electrostatic latent images, comprising: a toner, and negatively chargeable resin particles having an average particle size of 0.03–1.0 micron and a volume resistivity of $10^6$–$10^{12}$ ohm.cm.

According to another aspect of the present invention, there is provided an image forming apparatus, comprising:

a contact-charging means for charging a photosensitive member for bearing an electrostatic image while contacting the photosensitive member, and a developing means for developing an electrostatic image formed on the photosensitive member with a developer which comprises a toner, and negatively chargeable spherical resin particles having an average particle size of 0.03–1.0 micron and a resistivity of $10^6$–$10^{12}$ ohm.cm.

According to a further aspect of the present invention, there is provided an apparatus unit comprising: a photosensitive member; a contact charging means, a developing means for developing an electrostatic image formed on the photosensitive member with a developer which comprises a toner, and negatively chargeable spherical resin particles having an average particle size of 0.03–1.0 micron and a volume resistivity of $10^6$–$10^{12}$ ohm.cm;

wherein at least one of said contact-charging means and developing means is supported together with said photosensitive member to form a single unit, which can be connected to or released from an apparatus body as desired.

According to another aspect of the present invention, there is provided a facsimile apparatus, comprising: an electrophotographic apparatus and a receiving means for receiving image data from a remote terminal, wherein said electrophotographic apparatus comprises:

a contact-charging means for charging a photosensitive member for bearing an electrostatic image while contacting the photosensitive member, and a developing means for developing an electrostatic image formed on the photosensitive member with a developer which comprises a toner, and negatively chargeable spherical resin particles having an average particle size of 0.03–1.0 micron and a volume resistivity of $10^6$–$10^{12}$ ohm.cm.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
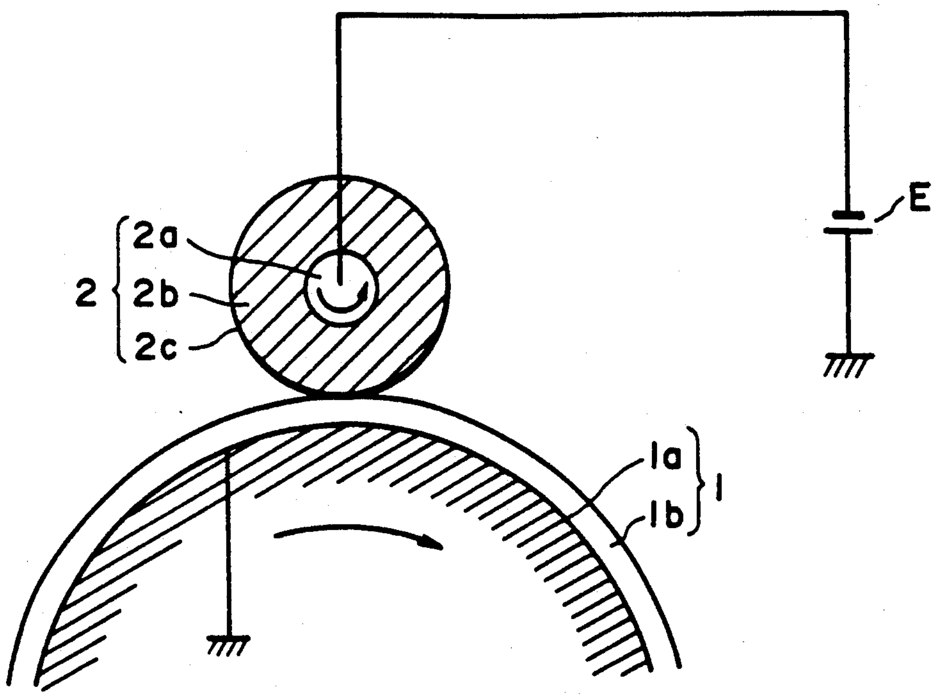
FIG. 1 is a schematic illustration of a contact-charging roller.

The developer according to the present invention contains negatively chargeable resin particles having an average particle size of 0.03–1 micron and a volume resistivity (i.e., specific resistance) of $10^6$–$10^{12}$ ohm.cm, so that it does not readily cause sticking of the toner onto a photosensitive member.

The negatively chargeable resin particles are effective for preventing the toner from adhering to the photosensitive member surface presumably for the following reasons.

A cause of toner sticking onto a photosensitive member is a scratch formed when the surface of the photosensitive member is rubbed with inorganic particles and a pressing or abutting member. The removal of free inorganic particles is effective for preventing the occurrence of such a scratch on the photosensitive member to prevent the toner sticking onto the photosensitive member. The negatively chargeably resin particles according to the present invention have a function of adsorbing free inorganic particles. This is clearly observed through a scanning electron microscope.

In an image forming apparatus equipped with a contact-charging apparatus, a portion of the negatively chargeable resin particles having passed by a cleaning blade may be adsorbed by a control charging means and further adsorb free inorganic particles passing by the cleaning blade on their surfaces to protect the photosensitive member surface.

The negatively chargeable resin particles used in the present invention have a primary average particle size of 0.03–1.0 micron, preferably 0.05–0.8 micron. Resin particles having an average particle size larger than 1.0 micron provide too small a specific surface area, so that they are not adequate to adsorb free inorganic particles such as silica, thus showing little effect in prevention of toner sticking. Resin particles having an average particle size smaller than 0.03 micron are liable to cause cleaning failure.

The negatively chargeable resin particles are preferably spherical and should have a volume resistivity of $10^6$–$10^{12}$ ohm.cm. Below $10^6$ ohm.cm, the charge of the developer is lowered to result in a low image density. Above $10^{12}$ ohm.cm, the fluidity of the developer is lowered to result in images with much fog.

It is preferred that the negatively chargeable resin particles have a triboelectric charge of $-50$ μC/g to $-400$ μC/g, particularly $-50$ μC/g to $-300$ μC/g. Below $-50$ μC/g, the sticking prevention effect is small to result in a low image density. Above $-400$ μC/g, the fluidity becomes worse.

The triboelectric charge of the negatively chargeable resin particles may be measured in the following manner.

0.2 g of sample resin particles are left standing overnight in an environment of a temperature of 25° C. and a humidity of 50–60% RH and then charged in a 200 cc-aluminum pot together with 99.8 g of carrier iron powder not coated with any resin and having a principal particle size in the range of 200–300 mesh (e.g., EFV 200/300), followed by mixing them for 60 minutes under the above-mentioned environmental conditions. The mixture is then subjected to sieving by using an aluminum cell having a 400 mesh-screen under a blow pressure of 0.5 kg/cm$^2$ to measure the triboelectric charge of the resin particles by the blow-off method.

The number-average particle size may be measured by a Coulter counter N4 (suitable for measurement in particle size range of 0.003–3 microns, available from Nikkaki K.K.) in a dispersed state in a solvent under application of an ultrasonic wave. It is also possible to use CAPA-5000 (available from Horiba Seisakusho K.K.). Resin particles having a substantially mono-dispersion pattern as produced by emulsion polymerization, etc. may also be taken as a scanning electron microscope (SEM) picture at a magnification of 7500–50,000, preferably 7500–10,000, for particle size measurement. For determining the number-average particle size, 20–50 spherical particles selected at random in the picture may be used for calculation.

Figure 4:
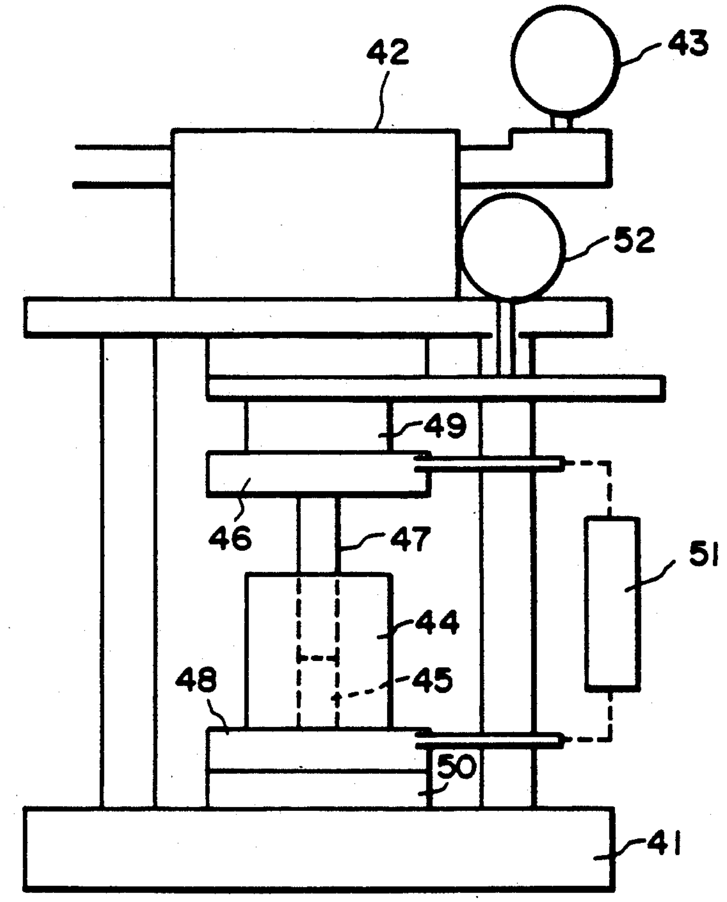
FIG. 4 is an instrument for measuring volume resistivity.

The volume resistivity (specific resistance) may be measured by using an apparatus as shown in FIG. 4 under the environmental conditions of a temperature of 23.5° C. and a humidity of 65% RH. Referring to FIG. 4, the apparatus includes a bench 41, a pressing means connected to a hand press and equipped with a pressure gauge 43, a hard glass cell 44 having a diameter of 3.100 cm for containing a sample 45, a brass press ram 46 having a diameter of 4.266 cm and an area of 14.2857 cm$^2$, a press bar 47 of stainless steel, a brass bench 48, insulating plates 49 and 50 of bakelite, a resistance meter 51 connected to the press ram 46 and bench 48, and a dial gauge 52.

In the apparatus shown in FIG. 4, when an oil pressure of 20 kg/cm$^2$ is applied by the hand press, the sample is supplied with a pressure of 576 kg/cm$^2$. The resistance is read at an applied voltage of 10 volts by the resistance meter 51, multiplied by the sample sectional area and divided by the sample height read by the dial gauge 52 to obtain a volume resistivity.

The negatively chargeable resin particles used in the present invention may preferably be spherical and, more specifically; may have a long axis/short axis ratio in the range of 1.0–1.02 for providing an excellent sticking-prevention effect onto a photosensitive member. Such spherical resin particles may be produced by emulsion polymerization, spray drying, etc.

It is preferred to use resin particles having a glass transition point of 80° C. or higher obtained by copolymerization of monomer components for production of a toner binder resin, such as styrene, acrylic acid, methyl methacrylate, butyl acrylate, and 2-ethylhexyl acrylate through emulsion polymerization.

The resin may be crosslinked by using a crosslinking agent such as divinylbenzene. It is also preferred that the resin particles may be surface-treated with metal, metal oxide, pigment, dye, surfactant, etc., so as to adjust the volume resistivity and the triboelectric charge.

The toner contained in the developer of the present invention may preferably have a volume-average particle size of 3–20 microns, particularly 4–15 microns.

In case where the toner is a magnetic toner, it is preferred that the magnetic toner has a volume-average particle size of 4–8 microns, particularly 6–8 microns, so as to provide a developer having a good resolution and causing little fog. The developer containing the magnetic toner may further preferably have a BET specific surface area of 1.8–3.5 m$^2$/g, a loose apparent density (or aerated bulk density) of 0.4– 0.52 g/cm$^3$ and a true density of 1.45–1.8 g/cm$^3$ so as to provide a good resolution and cause little fog.

A developer having a BET specific surface area of 1.8–3.5 m$^2$/g as measured by nitrogen adsorption shows an excellent performance from an early stage of operation, an excellent developer utilization efficiency and also a toner sticking-prevention effect onto the photosensitive member.

The developer of the present invention may preferably have a true density of 1.45–1.8 g/cm$^3$. In this range, the developer provides an appropriate application amount onto a latent image to provide a faithful, high-density image without thickening or thinning relative to the latent image. A true density of below 1.45 is liable to cause contamination in the apparatus due to scattering of the developer, toner-sticking onto the photosensitive member and increased fog.

The developer of the present invention may have a loose apparent density of 0.4–0.52 $g/cm^3$, which is characteristically small compared with the magnitude of the true density. The porosity calculated from the true density and the loose apparent density according to the following equation may preferably be 62–75%.

$$\text{Porosity } (\epsilon a) = [(\text{true density}) - (\text{apparent density})]/[\text{true density}] \times 100\ (\%)$$

The developer may preferably have a packed apparent density of 0.8–1.0 which may provide a porosity ($\epsilon p$) of 40–50%.

The developer satisfying the above properties does not cause plugging in the developing apparatus but may ensure a smooth supply to the developing zone, so that images showing a stable density can be always formed without white dropout. Further, the toner does not cause leakage, scattering or denaturation even after a large number of printing tests but can prevent toner-sticking onto the photosensitive member.

The BET specific surface area of the magnetic developer may be measured according to the BET one-point method by using a specific surface area meter (Autosorb 1, available from QUANTACHROME Co.).

The loose apparent density (or aerated bulk density) and packed apparent (or bulk) density referred to herein are based on the values measured by using Powder Test and the accompanying vessel (available from Hosokawa Micron K.K.) and according to the handling manual for the Powder Tester.

The true density referred to herein is based on values measured according to the following method which may be an accurate and convenient method for fine powder.

A stainless steel cylinder having an inner diameter of 10 mm and a length of about 50 cm, a disk (A) having an outer diameter of about 10 mm and a height of 5 mm, and a piston (B) having an outer diameter of about 10 mm and a length of about 8 cm which can be inserted into the cylinder in a close fitting, are provided. The disk (A) is placed at the bottom of the cylinder, about 1 g of a sample powder is placed thereon, and the piston (B) is gently pushed against the sample. Then, a pressure of 400 $kg/cm^2$ is applied to the piston by an oil press. After compression for 5 minutes, the compressed sample is taken out and weighed (W g), and the diameter (D cm) and height (L cm) of the compressed sample are measured by a micrometer caliper, whereby the true density is calculated according to the following equation:

$$\text{True density } (g/cm^3) = W/]\pi \times (D/2)^2 \times L]$$

The magnetic toner used in the present invention may preferably have a volume-average particle size of 4–8 microns, particularly, 6–8 microns, and such a particle size distribution including 17–60% by number of magnetic toner particles of 5 microns or smaller, 5–50% by number of magnetic toner particles of 6.35–10.08 microns and 2.0 volume % or less of magnetic toner particles of 12.7 microns or larger and further satisfying the following equation:

$$N/V = -0.05N + k,$$

wherein N denotes the contents in % by number of the magnetic toner particles of 5 microns or smaller, V denotes the content in % by volume of the magnetic toner particles of 5 microns or smaller, k is a positive number of 4.6–6.7, and N is a positive number of 17–60.

If the volume-average particle size of the magnetic toner is below 4 microns, the toner coverage on a transfer paper becomes small to result in a low image density for a usage having a large image area such as a graphic image. This may be attributable to the same reason why the image density of an inner image portion becomes lower than that at the contour or edge portion of the image as will be described hereinafter. Further, a volume-average particle size of below 4 microns is liable to result in toner-sticking onto the photosensitive member.

If the volume-average particle size of the magnetic toner is above 8 microns, the resolution is lowered to cause a lower image quality in a successive copying. If the content of magnetic toner particles of 5 microns or smaller is below 17% by number, the amount of magnetic toner particles effective for a high image quality and particularly, as the printing out is continued, the amount of the effective magnetic toner particle component is decreased to cause a fluctuation in magnetic toner particle size distribution and gradually deteriorates the image quality. If the content is above 60% by number, mutual agglomeration of the magnetic toner particles is liable to occur to produce toner lumps having a larger size than the proper size, thus leading to difficulties, such as rough image quality, a low resolution, a large difference in density between the contour and interior of an image to provide a somewhat hollow image, and also toner-sticking onto the photosensitive member.

It is preferred that the content of the particles in the range of 6.35–10.08 microns is 5–50% by number, particularly 8–40% by number. Above 50% by number, the image quality becomes worse, and excess of toner coverage is liable to occur, thus resulting in a poor reproducibility of thin lines and an increased toner consumption. Below 5% by number, it is difficult to obtain a high image density. The contents of the magnetic toner particles of 5 microns or smaller in terms of % by number (N %) and % by volume (V %) may preferably satisfy the relationship of $N/V = -0.05N + k$, wherein k represents a positive number satisfying $4.6 \leq k \leq 6.7$. The number k may preferably satisfy $4.6 \leq k \leq 6.2$, more preferably $4.6 \leq k \leq 5.7$. Further, as described above, the percentage N satisfies $17 \leq N \leq 60$, preferably $25 \leq N \leq 50$, more preferably $30 \leq N \leq 60$.

If $k < 4.6$, magnetic toner particles of 5.0 microns or below are insufficient, and the resultant image density, resolution and sharpness decrease. When fine toner particles in a magnetic toner, which have conventionally been considered useless, are present in an appropriate amount, they are effective for achieving closest packing of toner in development and contribute to the formation of a uniform image free of coarsening. Particularly, these particles fill thin-line portions and contour portions of an image, thereby to visually improve the sharpness thereof. If $k < 4.6$ in the above formula, such component becomes insufficient in the particle size distribution, and the above-mentioned characteristics become poor.

Further, in view of the production process, a large amount of fine powder must be removed by classification in order to satisfy the condition of $k<4.6$. Such a process is however disadvantageous in yield and toner costs. On the other hand, if $k>6.7$, an excess of fine powder is present, whereby the resultant image density is liable to decrease in successive print-out. The reason for such a phenomenon may be considered that an excess of fine magnetic toner particles having an excess amount of charge are triboelectrically attached to a developing sleeve and prevent normal toner particles from being carried on the developing sleeve and being supplied with charge.

In the magnetic toner of the present invention, the amount of magnetic toner particles having a particle size of 12.7 microns or larger is 2.0 by volume or smaller, preferably 1.0% by volume or smaller, more preferably 0.5% by volume or smaller. If the above amount is larger than 2.0% by volume, these particles are liable to impair thin-line reproducibility.

The particle size distribution of a toner is measured by means of a Coulter counter in the present invention, while it may be measured in various manners.

Coulter counter Model TA-II (available from Coulter Electronics Inc.) is used as an instrument for measurement, to which an interface (available from Nikkaki K.K.) for providing a number-basis distribution, and a volume-basis distribution and a personal computer CX-1 (available from Canon K.K.) are connected.

For measurement, a 1%-NaCl aqueous solution as an electrolytic solution is prepared by using a reagent-grade sodium chloride. Into 100 to 150 ml of the electrolytic solution, 0.1 to 5 ml of a surfactant, preferably an alkylbenzenesulfonic acid salt, is added as a dispersant, and 2 to 20 mg of a sample is added thereto. The resultant dispersion of the sample in the electrolytic liquid is subjected to a dispersion treatment for about 1-3 minutes by means of an ultrasonic disperser, and then subjected to measurement of particle size distribution in the range of 2-40 microns by using the above-mentioned Coulter counter Model TA-II with a 100 micron-aperture to obtain a volume-basis distribution and a number-basis distribution. Form the results of the volume-basis distribution and number-basis distribution, parameters characterizing the magnetic toner of the present invention may be obtained.

The binder for use in constituting the toner may be a known binder resin for toners. Examples thereof may include: polystyrene; homopolymers of styrene derivatives, such as poly-p-chlorostyrene, and polyvinyltoluene; styrene copolymers, such as styrene-propylene copolymer, styrene-vinyltoluene copolymer, styrene-vinylnaphthalene copolymer, styrene-methylacrylate copolymer styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, styrene-maleic acid ester copolymer; polymethyl methacrylate, polybutyl methacrylate, polyvinyl acetate, polyethylene, polypropylene, polyvinyl butyral, polyacrylic acid resin, rosin, modified rosin, terpene resin, phenolic resin, aliphatic or alicyclic hydrocarbon resin, aromatic petroleum resin, paraffin wax, and carnauba wax. These resins may be used singly or in mixture.

The colorant which may be contained in the toner may be a pigment or dye, inclusive of carbon black and copper phthalocyanine, conventionally used.

Magnetic particles contained in the magnetic toner according to the present invention may comprise a material which may be magnetized in a magnetic field. Examples thereof may include: powder of ferromagnetic metal, such as iron, cobalt or nickel; or alloys or compounds, such as iron-based alloys, nickel-based alloys, magnetite, $\gamma$-$Fe_2O_3$ and ferrites.

The magnetic particles may preferably have a BET specific surface area as measured by nitrogen adsorption of 1-20 $m^2/g$, particularly 2.5-12 $m^2/g$ and Mohs' hardness of 5-7. The magnetic particles may be contained in a 10-70% by weight of the toner.

The toner used in the present invention may preferably be negatively chargeable and may contain a charge control agent, as desired, examples of which may include: metal complexes or salts of monoazo dyes, salicylic acid, alkylsalicylic acid, dialkylsalicylic acid, and naphthoic acid. The magnetic toner may preferably have a volume resistivity of $10^{10}$ ohm.cm or higher, particularly $10^{12}$ ohm.cm or higher in respects of triboelectric chargeability and electrostatic transfer characteristic. The volume resistivity referred to herein may be defined as a value obtained by molding a toner sample under a pressure of 100 $kg/cm^2$, applying an electric field of 100 V/cm and measuring a current value at a time one minute after the commencement of the application, whereby the volume resistivity is calculated based on the measured current value.

The toner-binder resin constituting the developer according to the present invention may particularly preferably be one containing 3-20 wt. parts of polymerized units of a monomer having a carboxylic group or an acid anhydride group derived therefrom per 100 wt. parts of the binder resin and having an acid value of 1-70.

The binder resin having an acid group may comprise various resins and may preferably be one containing a tetrahydrofuran (THF)-soluble content which has a weight-average molecular weight/number-average molecular weight ratio of 5 or larger ($Mw/Mn \geqq 5$) and also has a peak in the molecular weight range of from 2000 to below 15000, preferably 2000-10000 and a peak or shoulder in the molecular weight range of 15000-100,000 based on the molecular weight distribution by gel-permeation chromatography (GPC) of the THF-soluble content. This is because the THF-insoluble content principally affects the anti-offset characteristic and anti-winding characteristic, a component having a molecular weight of below 15,000, particularly 10,000 or below, principally affects the blocking, sticking onto the photosensitive member and filming, and a component having a molecular weight of 10,000 or above, particularly 15,000 or above, principally affects the fixing characteristic.

The binder resin (copolymer) having an acid group of carboxyl or its anhydride may be contained in either one or both of the above-mentioned two molecular weight regions.

The GPC (gel permeation chromatography) measurement and identification of molecular weight corresponding to the peaks and/or shoulders may be performed under the following conditions.

A column is stabilized in a heat chamber at 40° C., tetrahydrofuran (THF) solvent is caused to flow through the column at that temperature at a rate of 1 ml/min., and 50–200 μl of a sample resin solution in THF at a concentration of 0.05–0.6 wt. % is injected. The identification of sample molecular weight and its molecular weight distribution is performed based on a calibration curve obtained by using several monodisperse polystyrenedisperse samples and having a logarithmic scale of molecular weight versus count number. The standard polystyrene samples for preparation of a calibration curve may be those having H molecular weights of, e.g., $6\times10^2$, $2.1\times10^3$, $4\times10^3$, $1.75\times10^4$, $1\times10^4$, $1.1\times10^5$, $3.9\times10^5$, $8.6\times10^5$, $2\times10^6$ and $4.48\times10^6$ available from, e.g., Pressure Chemical Co. or Toyo Soda Kogyo K.K. It is appropriate to use at least 10 standard polystyrene samples. The detector may be an RI (refractive index) detector.

For accurate measurement of molecular weights in the range of $10^3$–$4\times10^6$, it is appropriate to constitute the column as a combination of several commercially available polystyrene gel columns. A preferred example thereof may be a combination of μ-styragel 500, $10^3$, $10^4$ and $10^5$ available from Waters Co.; a combination of Shodex KF-80M, 802, 803, 804 and 805, or a combination of TSK gel G1000H, G2000H, G2500H, G3000H, G4000H, G5000H, G6000H, G7000H and GMH available from Toyo Soda K.K.

The content of a component having a molecular weight of 10,000 or below in the binder resin is measured by cutting out a chromatogram of the corresponding molecular weight portion and calculating a ratio of the weight thereof with that of the chromatogram covering the molecular weight range of 10,000 or higher, to derive the weight % thereof in the whole binder resin.

Examples of the polymerizable monomer having an acid group which may be used in the present invention may include; α,β-unsaturated carboxylic acids, such as acrylic acid and methacrylic acid; α,β-unsaturated dicarboxylic acids and half esters thereof, such as maleic acid, butyl maleate, octyl maleate, fumaric acid and butyl fumarate; and alkenyldicarboxylic acids or half esters thereof, such as n-butenylsuccinic acid, n-octenylsuccinic acid, butyl n-butenylsuccinate, n-butenylmalonic acid and n-butenyladipic acid.

In this case, it is preferred that the content of the polymerizable monomer unit in the whole binder resin may preferably be in a proportion of 3–30 wt. and the binder resin as a whole has an acid value of 1–70, further preferably 5–50.

The acid values referred to herein are based on values measured as follows according to JIS K-0670.

2–10 g of a sample resin is weighed in a 200–300 ml-Erlenmeyer flask, and about 50 ml of a solvent mixture of ethanol/benzene (=½) to dissolve the resin. If the solubility is insufficient, a small amount of acetone may be added. The solution is titrated with a N/10-caustic potassium solution in ethanol, which has been standardized in advance, in the presence of a phenolphthalein indicator, whereby the acid value (mgKOH/g) of the sample resin is calculated from the consumed amount of the caustic potassium solution according to the following equation (3):

$$\text{Acid value} = \text{Amount of KOH solution (ml)} \times N \times 56.1/\text{sample weight} \quad (3)$$

wherein N denotes the number of factor for the N/10 KOH.

Examples of the comonomer for providing the binder resin having an acid group through copolymerization with the polymerizable monomer having an acid group may include: styrene; styrene derivatives, such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tertbutylstyrene, p-n-hexylstyrene, p-n-octylstyrene, p-n-nonylstyrene, p-n-decylstyrene, and p-n-dodecylstyrene; ethylenically unsaturated monoolefins, such as ethylene, propylene, butylene, and isobutylene; unsaturated polyenes, such as butadiene; vinyl halides, such as vinyl chloride, vinylidene chloride, vinyl bromide, and vinyl fluoride; vinyl esters, such as vinyl acetate, vinyl propionate, and vinyl benzoate; α-methylene-aliphatic monocarboxylic acid esters, such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylic acid esters, such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers, such as vinyl methyl ether, vinyl ethyl ether, and vinyl isobutyl ether; vinyl ketones, such as vinyl methyl ketone, vinyl hexyl ketone, and methyl isopropenyl ketone; N-vinyl compounds, such as N-vinylpyrrole, N-vinylcarbazole, N-vinylindole, and N-vinylpyrrolidone; and derivatives acrylic acid and methacrylic acid, such as acrylonitrile, methacrylonitrile and acrylamide.

These vinyl monomers may be used singly or in mixture of two or more species in combination with the above-mentioned monomer having an acid group.

Among the above, a monomer combination providing a styrene copolymer or a styrene-(meth)acrylate copolymer is particularly preferred.

A crosslinking monomer, e.g., one having at least two polymerizable double bonds, may also be used.

Thus, the vinyl copolymer used in the present invention may preferably be a crosslinked polymer with a crosslinking monomer as follows:

Aromatic divinyl compounds, such as divinylbenzene and divinylnaphthalene; diacrylate compounds connected with an alkyl chain, such as ethylene glycol diacrylate, 1,3-butylene glycol diacrylate, 1,4-butanediol diacrylate, 1,5-pentanediol diacrylate, 1,6-hexanediol diacrylate, and neopentyl glycol diacrylate, and compounds obtained by substituting methacrylate groups for the acrylate groups in the above compounds; diacrylate compounds connected with an alkyl chain including an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate and compounds obtained by substituting methacrylate groups for the acrylate groups in the above compounds; diacrylate compounds connected with a chain including an aromatic group and an ether bond, such as polyoxyethylene(2)-2,2-bis(4-hydroxyphenyl)propanediacrylate, polyoxyethylene(4)-2,2-bis(4-hydroxyphenyl)propanediacrylate, and compounds obtained by substituting methacrylate groups for the acrylate groups in the above compounds; and polyester-type diacrylate compounds, such as one known by a trade name of MANDA (available from Nihon Kayaku K.K.).

Polyfunctional crosslinking agents, such as pentaerythritol triacrylate, trimethylethane triacrylate, tetramethylolmethane tetracrylate, oligoester acrylate, and compounds obtained by substituting methacrylate groups for the acrylate groups in the above compounds; triallyl cyanurate and triallyl trimellitate.

These crosslinking agents may preferably be used in a proportion of about 0.01-5 wt. parts, particularly about 0.03-3 wt. parts, per 100 wt. parts of the other monomer components.

Among the above-mentioned crosslinking monomers, aromatic divinyl compounds (particularly, divinylbenzene) and diacrylate compounds connected with a chain including an aromatic group and an ether bond may suitably be used in a toner resin in view of fixing characteristic and anti-offset characteristic.

The binder resin according to the present invention may suitably be prepared through a process for synthesizing two or more polymers or copolymers.

For example, a first polymer or copolymer soluble in THF and also in a polymerizable monomer is dissolved in such a polymerizable monomer, and the monomer is polymerized to form a second polymer or copolymer, thus providing a resin composition comprising a uniform mixture of the first polymer or copolymer and the second polymer or copolymer.

The first polymer or copolymer may preferably be formed through solution polymerization or ionic polymerization. The second polymer or copolymer providing a THF-insoluble content may preferably be prepared through suspension polymerization or bulk polymerization of a monomer dissolving the first polymer or copolymer in the presence of a crosslinking monomer. It is preferred that the first polymer or copolymer is used in a proportion of 10–120 wt. parts, particularly 20–100 wt. parts, per 100 wt. parts of the polymerizable monomer giving the second polymer or copolymer.

The solvent used in the solution polymerization may be xylene, toluene, cumene, acid cellosolve, isopropyl alcohol, benzene, etc. In case of a styrene monomer, xylene, toluene or cumene may be preferred. The solvent may be selected depending on the product polymer. Further, an initiator, such as di-tert-butyl peroxide, tert-butyl peroxybenzoate, benzoyl peroxide, 2,2'-azobisisobutyronitrile, 2,2'-azobis(2,4-dimethylvaleronitrile), etc., may be used in a proportion of 0.1 wt. part or more, preferably 0.4–15 wt. parts, per 100 wt. parts of the monomer. The reaction temperature may vary depending on the solvent, initiator, monomers, etc., to be used but may suitably be in the range of 70°-180° C. In the solution polymerization, the monomer may be used in an amount of 30–400 wt. parts per 100 wt. parts of the solvent.

The developer according to the present invention may preferably contain a hydrophobic inorganic fine powder as an additive, which may preferably be a hydrophobic metal oxide fine powder, further preferably hydrophobic silicic acid (silica) fine powder.

Among the above-mentioned inorganic powders, those having a specific surface area as measured by the BET method with nitrogen adsorption of 70–300 $m^2/g$, provide a good result. In the present invention, a hydrophobic silica fine powder may preferably be used in an amount of 0.1–3.0 wt. parts, more preferably 0.2–2.0 wt. parts, with respect to 100 wt. parts of the toner.

In the present invention, it is preferred to use negatively chargeable hydrophobic silica fine powder. The hydrophobic silica fine powder used in the present invention may preferably be one having a triboelectric charge amount of $-100\ \mu C/g$ to $-300\ \mu C/g$. When the silica fine powder having a triboelectric charge below $-100\ \mu C/g$ is used, it tends to decrease the triboelectric charge of the developer per se, whereby humidity characteristic becomes poor. When silica fine powder having a triboelectric charge of above $-300\ \mu C/g$ is used, it tends to promote a so-called "memory phenomenon" on a developer-carrying member and the developer may easily be affected by deterioration of the silica, whereby durability characteristic may be impaired. When the silica is too fine so that its BET specific surface area is above 300 $m^2/g$, the addition thereof produces little effect. When the silica is too coarse so that its BET specific surface area is below 70 $m^2/g$, the probability of free powder presence is increased, whereby the dispersion thereof in the toner is liable to be ununiform. In such a case, black spots due to silica agglomerates are liable to occur.

The triboelectric charge of the negatively chargeable silica fine powder may be measured in the following manner.

0.2 g of silica fine powder which have been left to stand overnight in an environment of 23.5° C. and relative humidity of 60% RH, and 9.8 g of carrier iron powder not coated with a resin having a mode particle size of 200 to 300 mesh (e.g. EFV 200/300, produced by Nippon Teppun K.K.) are mixed thoroughly in an aluminum pot having a volume of about 50 cc in the same environment as mentioned above (by shaking the pot in hands vertically about 50 times for about 20 sec).

Figure 3:
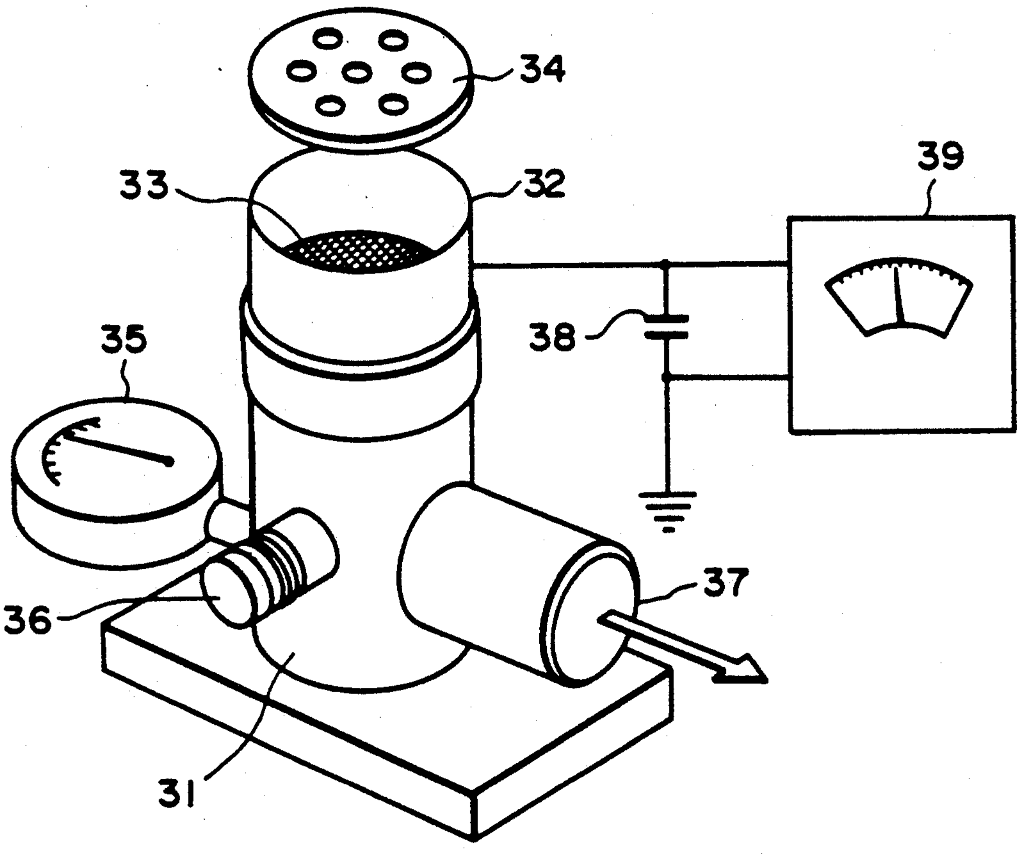
FIG. 3 is an illustration of an instrument for measuring triboelectric charges.

Then, about 0.5 g of the shaken mixture is charged in a metal container 32 for measurement provided with 400-mesh screen 33 at the bottom as shown in FIG. 3 and covered with a metal lid 34. The total weight of the container 32 is weighed and denoted by $W_1$ (g). Then, an aspirator 31 composed of an insulating material at least with respect to a part contacting the container 32 is operated, and the silica in the container is removed by suction through a suction port 37 sufficiently while controlling the pressure at a vacuum gauge 35 at 250 mmHg by adjusting an aspiration control valve 36. The reading at this time of a potential meter 39 connected to the container by the medium of a capacitor having a capacitance C ($\mu F$) is denoted by V (volts.). The total weight of the container after the aspiration is measured and denoted by $W_2$ (g). Then, the triboelectric charge ($\mu C/g$) of the silica is calculated as: $C \times V/(W_1 - W_2)$.

The fine silica powder used in the present invention can be either the so-called "dry process silica" or "fumed silica" which can be obtained by oxidation of gaseous silicon halide, or the so-called "wet process silica" which can be produced from water glass, etc. Among these, the dry process silica is preferred to the wet process silica because the amount of the silanol group present on the surfaces or in interior of the particles is small and it is free from production residue such as $Na_2O$, $SO_3^{2-}$.

The dry process silica referred to herein can include a complex fine powder of silica and another metal oxide as obtained by using another metal halide, such as aluminum chloride or titanium chloride together with a silicon halide.

The silica powder may preferably have an average primary particle size in the range of 0.001–2 microns, particularly 0.002–0.2 microns.

In the present invention, the hydrophobicity of the silica fine powder may be measured in the following manner, while another method can be applied with reference to the following method.

A sample in an amount of 0.1 g is placed in a 200 ml-separating funnel equipped with a sealing stopper, and 100 ml of ion-exchanged water is added thereto. The mixture is shaken for 10 min. by a Turbula Shaker Mixer model T2C at a rate of 90 r.p.m. The separating funnel is then allowed to stand still for 10 min. so that a silica powder layer and an aqueous layer are separated from each other, and 20–30 ml of the content is withdrawn from the bottom. A portion of the water is taken in a 10 mm-cell and the transmittance of the thus withdrawn water is measured by a colorimeter (wavelength: 500 nm) in comparison with ion-exchanged water as a blank containing no silica fine powder. The transmittance of the water sample is denoted a the hydrophobility of the silica.

The hydrophobic silica used in the present invention should preferably have a hydrophobicity of 60 or higher, particularly 90% or higher. If the hydrophobicity is below 60%, high-quality images cannot be attained because of moisture absorption by the silica fine powder under a high-humidity condition.

The hydrophobicity-imparting treatment may be effected by using a known agent and a known method. The hydrophobicity-imparting agent may for example be a silane coupling agent, or a silicon oil or silicone varnish. A silicone oil or silicone varnish may be preferred to a silane coupling agent in respects of hydrophobicity and lubricity.

The silicone oil or silicone varnish preferably used in the present invention may be those represented by the following formula:

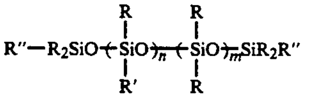

wherein R: a $C_1$–$C_3$ alkyl group, R': a silicone oil-modifying group, such as alkyl, halogen-modified alkyl, phenyl, and modified-phenyl, R'': a $C_1$–$C_3$ alkyl or alkoxy group.

Specific examples thereof may include: dimethylsilicone oil, alkyl-modified silicone oil, α-methylstyrene-modified silicone oil, chlorophenylsilicone oil, and fluoro-modified silicone oil. The above silicone oil may preferably have a viscosity at 25° C. of about 50–1000 centi-stokes. A silicon oil having too low a molecular weight can generate a volatile matter under heating, while one having too high a molecular weight has too high a viscosity leading to a difficulty in handling.

In order to treat the silica fine powder with silicone oil, there may be used a method wherein silica fine powder treated with a silane coupling agent is directly mixed with a silicone oil by means of a mixer such as Henschel mixer; a method wherein a silicone oil is sprayed on silica as a base material; or a method wherein a silicone oil is dissolved or dispersed in an appropriate solvent, the resultant liquid is mixed with silica as a base material, and then the solvent is removed to form a hydrophobic silica.

It is further preferred to treat the inorganic fine powder first with a silicone oil or silicone varnish.

When the inorganic fine powder is treated only with a silicone oil, a large amount of silicone oil is required, so that the fine powder can agglomerate to provide a developer with a poor fluidity and the treatment with a silicone oil must be carefully performed. However, if the fine powder is first treated with a silane coupling agent and then with a silicone oil, the fine powder is provided with a good moisture resistance while preventing agglomeration of the powder and thus the treatment effect with a silicone oil can be sufficiently exhibited.

The silane coupling agent used in the present invention may be hexamethyldisilazane or those represented by the formula: $R_mSiY_n$, wherein R: an alkoxy group or chlorine atom, m: an integer of 1–3, Y: alkyl group, vinyl group, glycidoxy group, methacryl group or other hydrocarbon groups, and n: an integer of 3–1. Specific examples thereof may include: dimethyldichlorosilane, trimethylchlorosilane, allyldimethylchlorosilane, allylphenyldichlorosilane, benzyldimethylchlorosilane, vinyltriethoxysilane, γ-methaceryloxypropyltrimethoxysilane, vinyltriacetoxysilane, divinylchlorosilane, and dimethylvinylchlorosilane.

The treatment of the fine powder with a silane coupling agent may be performed in a dry process wherein the fine powder is agitated to form a cloud with which a vaporized or sprayed silane coupling agent is reacted, or in a wet process wherein the fine powder is dispersed in a solvent into which a silane coupling agent is added dropwise to be reacted with the fine powder.

The silicone oil or silicone varnish may be used in an amount 1–35 wt. parts, preferably 2–30 wt. parts, to treat 100 wt. parts of the inorganic fine powder. If the amount of the silicone oil or silicone varnish is too small, it is possible that the moisture resistance is not improved to fail to provide high quality copy images. If the silicon oil or silicone varnish is too much, the inorganic fine powder is liable to agglomerate and even result in free silicone oil or silicone varnish, thus leading to failure in improving the fluidity of the developer.

In the developer of the present invention, it is preferred that the amount (B wt. parts) of the hydrophobic inorganic fine powder is larger than the amount (A wt. parts) of the negatively chargeable resin particles.

It is preferred that the negatively chargeable resin particles are used in an amount of 0.01–1.0 wt. part, preferably 0.03–0.5 wt. part, and the hydrophobic inorganic fine powder is used in an amount of 0.1–3.0 wt. parts, preferably 0.2–2.0 wt. parts, further preferably 0.6–1.6 wt. parts, respectively per 100 wt. parts of the developer (only toner particles except for the carrier).

When the amount (A wt. parts) of the negatively chargeable resin particles is larger than 1.0 wt. part, the image density is liable to decrease and, if the amount A is below 0.01 wt. part, the toner sticking-prevention effect onto the photosensitive member is scarce. If the amount A ≧ the amount B, the fluidity of the developer is lowered to be liable to cause fog.

In the present invention, it is further preferred to use the negatively chargeable resin particles, the hydrophobic inorganic fine powder and aliphatic acid metal salt fine powder in combination in the developer in order to prevent or suppress the generation of ozone and prevent or suppress the toner sticking onto the photosensitive member when the developer is used in an image forming apparatus equipped with a contact charging means.

The aliphatic acid metal salt fine powder used in the present invention may preferably be positively chargeable so as not to cause easy transfer, have a primary average particle size of 1 micron or smaller and contain 12 or more carbon atoms in the aliphatic acid. Specifically preferred examples thereof may include fine powder of: zinc stearate and aluminum stearate.

It is preferred to use the aliphatic acid metal salt fine powder in an amount of 0.01–1 wt. part, more preferably 0.05–0.7 wt. part, still more preferably 0.05–0.3 wt. part, per 100 wt. parts of the toner particles.

If the amount of the aliphatic acid metal salt fine powder is denoted by C wt. parts, it is preferred to set the amount so as to satisfy the relations of A wt. parts+C wt. parts<B wt. parts and 4×C wt. parts<B wt. parts.

In case of A wt. parts+C wt. parts≧B wt. parts, the fluidity of the developer is lowered and, in case of 4×C wt. parts≧B wt. parts, the developer carrying member such as sleeve, photosensitive member and member contacting the photosensitive member are liable to be contaminated, and the decrease in image density and image irregularities are liable to occur.

To the developer according to the present invention, it is possible to further incorporated other additives within an extent not giving ill effects, which may for example include a fixing aid, such as low-molecular weight polyethylene, and a metal oxide such as tin oxide as a chargeability-imparting agent.

The toner used in the present invention may be prepared by a method in which toner constituents are kneaded well in a hot kneading means, such as a kneader or extruder, mechanically crushed and classified; a method wherein a binder resin solution containing other components dispersed therein is spray-dried; a polymerization method wherein prescribed ingredients are dispersed in a monomer constituting a binder resin and the mixture is emulsified, followed by polymerization of the monomer to provide a polymer; etc.

Hereinbelow, a contact-charging step applicable to the developer and the image forming method according to the present invention will be explained more specifically.

FIG. 1 is a schematic illustration of a contact-charging apparatus as an embodiment of the invention. The apparatus includes a photosensitive drum 1 as a member to be charged which comprises an aluminum drum substrate 1*a* and an OPC (organic photoconductor) layer 1*b* coating the outer surface of the drum 1*a* and rotates at a prescribed speed in a direction of an arrow. In this embodiment, the photosensitive drum 1 has an outer diameter of 30 mm. The apparatus further includes a charging roller 2 as a charging means which contacts the photosensitive drum 1 at a prescribed pressure. The charging roller 2 comprises a metal core 2*a*, an electroconductive rubber roller 2*b* and a surface layer 2*c* having a releasable film. The electroconductive rubber layer 2*b* may suitably have a thickness of 0.5–10 mm, preferably 1–10 mm. The surface layer comprising a film with a releasability is preferred n respect of compatibility with the developer and the image forming method according to the present invention. If the releasable film has too high a resistivity, the photosensitive drum cannot be charged but, if the resistivity is too small, an excessively large voltage is applied to the photosensitive drum, so that it is preferred for the releasable film to have an appropriate resistivity value, preferably a volume resistivity of $10^9$–$10^{14}$ ohm.m. The releasable film may preferably have a film thickness of 30 microns or below, particularly 10–30 microns. The lower limit in thickness of the releasable film may be determined so as not to cause peeling or tearing and may be about 5 microns.

In this embodiment, the charging roller 2 has an outer diameter of 12 mm and includes an about 3.5 mm-thick electroconductive rubber layer 2*b* of ethylene-propylene-diene terpolymer and 10 micron-thick surface layer 2*c* of a nylon resin (more specifically, methoxymethylated nylon). The charging roller 2 has a hardness of 54.5 degrees (ASKER-C). A prescribed is supplied to the core metal 2*a* (diameter=5 mm) of the charging roller 2 from a power supply E. FIG. 1 shows that a DC voltage is supplied from E but a DC voltage superposed with an Al voltage is preferred.

It is preferred to disperse electroconductive fine powder such as carbon in the electroconductive rubber layer or/and the releasable film so as to adjust the resistivity.

Preferred process conditions in this embodiment may be as follows.

Abutting pressure: 5–500 g/cm
AC voltage: 0.5–5 kVpp
AC frequency: 50–3000 Hz
DC voltage: −200 to −900 V.

Figure 2:
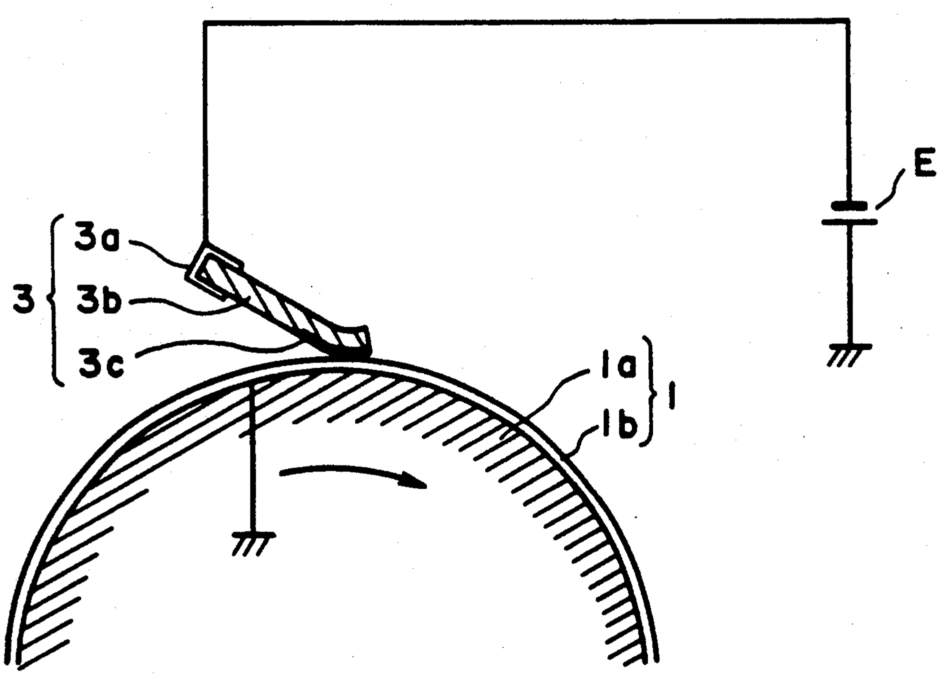
FIG. 2 is a contact-charging blade, respectively according to the present invention.

FIG. 2 is an illustration of a contact-charging means according to another embodiment of the present invention, wherein like reference numerals are used to denote like member as used in FIG. 1, the explanation of which is omitted here.

A contact-charging member 3 in this embodiment is in the form of a blade abutted at a prescribed pressure against a photosensitive member 1 in a forward direction as shown. The blade 3 comprises a metal support 3*a* to which a voltage is supplied and on which an electroconductive rubber piece 3*b* is supported. Further, the portion abutting or contacting a photosensitive drum is provided with a surface layer 3*c* comprising a releasable film. In a specific embodiment, the surface layer 3*c* comprised 10 micronthick nylon. According to this embodiment, a difficulty such as sticking between the blade and the photosensitive member is not encountered to show a similar performance as in the previous embodiment.

In the above-embodiment, charging members in the form of a roller and a blade have been explained, but the shape is not restricted as such and other shapes can also be used.

In the above embodiments, the charging member comprises an electroconductive rubber layer and a releasable film but this is not necessary. Further, it is preferred to insert a high resistance layer for preventing leakage, such as a hydrin rubber layer having a good environmental stability between the conductive rubber layer and the releasable film surface layer.

It is possible to use a releasable film of polyvinylidene fluoride (PVDF) or polyvinylidene chloride (PVDC) instead of nylon resin. The photosensitive member may also comprise amorphous silicon, selenium, ZnO, etc., in addition to an OPC photosensitive member. Particularly, in the case of using a photosensitive member of amorphous silicon, image flow becomes noticeable when even a small amount of a softening agent from the conductive layer attaches to the photosensitive member compared with a case of using another photosensitive member, the coating of the conductive rubber layer with an insulating film becomes remarkably effective.

In the cleaning step according to the present invention, the photosensitive drum after toner image transfer is wiped by a cleaning member such as a cleaner blade or roller for removal of the transfer residue toner or other contaminants thereon to be cleaned and repetitively subjected to image formation.

Such a cleaning step can also be effected simultaneously as the charging step, developing step or transfer step.

The present invention is particularly effective when applied to an image forming apparatus equipped with a latent image-bearing member which is surfaced with an organic compound. In case where the surface layer is formed of an organic compound, a binder resin in the toner and the surface layer are likely to adhere to each other and toner sticking is liable to occur at the contacting point especially when similar materials are used.

The surfacing material for the latent image bearing member used in the present invention may comprise, e.g., silicone resins, vinylidene chloride resins, ethylene-vinyl chloride resin, styrene-acrylonitrile resin, styrene-methyl methacrylate resin, styrene resins, polyethylene terephthalate resins and polycarbonate resins, but can comprise another material, such as copolymers of or with other monomers, copolymers between above enumerated components and polymer blends without being restricted to the above. Among these, polycarbonate resins are particularly preferred.

The present invention is particularly effective when applied to an image forming apparatus using a latent image-bearing member having a diameter of 50 mm or smaller. In such a small-sized drum, an identical linear pressure can produce a concentration of stress at the abutting point because of a large curvature.

A similar phenomenon may be encountered also in case of a belt photosensitive member, and accordingly the present invention is also effective to an image forming apparatus using a photosensitive member having a radius of curvature of 25 mm or smaller at the transfer zone.

Figure 5:
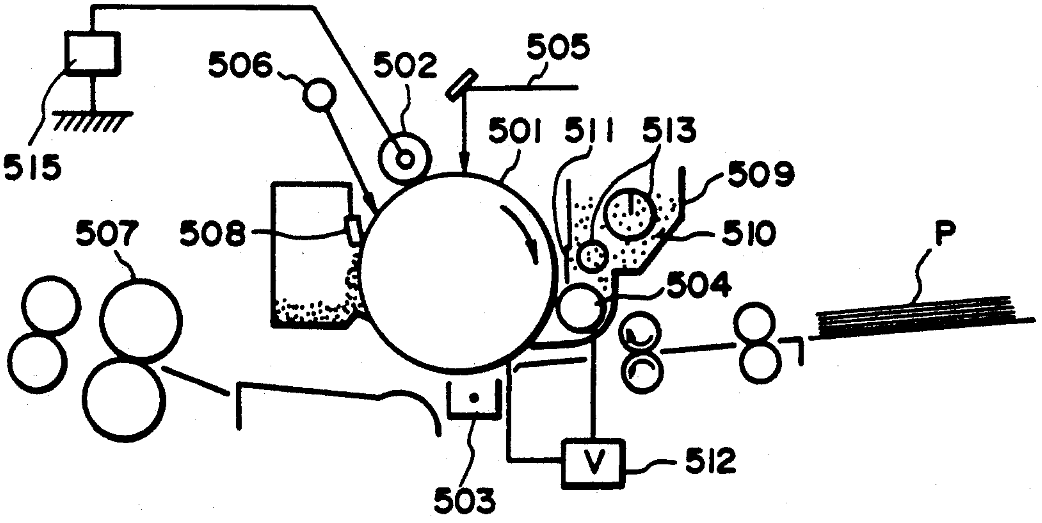
FIG. 5 is a schematic illustration of an embodiment of the image forming apparatus according to the present invention.

Referring to FIG. 5, the image forming method and image forming apparatus according to the present invention are explained.

A photosensitive member 501 surface is negatively charged by a contact charger 502 connected to a voltage application means 515, subjected to image-scanning with laser light 505 to form a digital latent image, and the resultant latent image is reversely developed with a negatively chargeable monocomponent magnetic developer 510 in a developing vessel 509 equipped with a magnetic blade 511 and a developing sleeve 514 containing a magnet therein. In the developing zone, an alternating bias, pulse bias and/or DC bias is applied between the conductive substrate of the photosensitive drum 501 and the developing sleeve 504 by a bias voltage application means. When a transfer paper P is conveyed to a transfer zone, the paper is charged from the back side (opposite side with respect to the photosensitive drum), whereby the developed image (toner image) on the photosensitive drum is electrostatically transferred to the transfer paper P. Then, the transfer paper P is separated from the photosensitive drum 501 and subjected to fixation by means of a hot pressing roller fixer 507 for fixing the toner image on the transfer paper P.

Residual monocomponent developer remaining on the photosensitive drum after the transfer step is removed by a cleaner 508 having a cleaning blade. The photosensitive drum 501 after the cleaning is subjected to erase-exposure for discharge and then subjected to a repeating cycle commencing from the charging step by the charger 502.

The electrostatic image-bearing member (photosensitive drum) comprises a photosensitive layer and a conductive substrate and rotates in the direction of the arrow. The developing sleeve 504 comprising a non-magnetic cylinder as a toner-carrying member rotates so as to move in the same direction as the electrostatic image holding member surface at the developing zone. Inside the non-magnetic cylinder sleeve 504, a multi-pole permanent magnet (magnet roll) as a magnetic field generating means is disposed so as not to rotate. The monocomponent insulating magnetic developer 510 stirred by a stirrer 513 in the developing vessel 509 is applied onto the non-magnetic cylinder sleeve 504 and the toner particles are provided with, e.g., a negative triboelectric charge due to friction between the sleeve 504 surface and the toner particles. Further, the magnetic doctor blade 511 of iron is disposed adjacent to the cylinder surface (with a spacing of 50–500 microns) and opposite to one magnetic pole of the multi-pole permanent magnet, whereby the thickness of the developer layer is regulated at a thin and uniform thickness (30–300 microns) which is thinner than the spacing between the electrostatic image bearing member 501 and the toner carrying member 504 so that the developer layer does not contact the image bearing member 501. The revolution speed of the toner carrying member 504 is so adjusted that the circumferential velocity of the sleeve 504 is substantially equal to or close to that of the electrostatic image bearing member 501. It is possible to constitute the magnetic doctor blade 511 with a permanent magnet instead of iron so as to form a counter magnetic pole. In the developing zone, an AC bias or a pulsed bias may be applied between the toner carrying member 504 and the electrostatic image bearing surface by the biasing means 512. The AC bias may comprise f=200–4000 Hz and Vpp=500–3000 V.

In the developing zone, the toner particles are transferred to the electrostatic image under the action of an electrostatic force exerted by the electrostatic image bearing surface and the AC bias or pulsed bias.

It is also possible to use an elastic blade of an elastic material, such as silicone rubber, instead of the magnetic iron blade, so as to apply the developer onto the developer carrying member and regulate the developer layer thickness by a pressing force exerted by the elastic blade.

In the electrophotographic apparatus, plural members inclusive of some of the above-mentioned members such as the photosensitive member, developing means and cleaning means can be integrally combined to form an apparatus unit so that the unit can be connected to or released from the apparatus body. For example, at least one of the charging means, developing means and cleaning means can be integrally combined with the photosensitive member to form a single unit so that it can be attached to or released from the apparatus body by means of a guide means such as a guide rail provided to the body.

Figure 6:
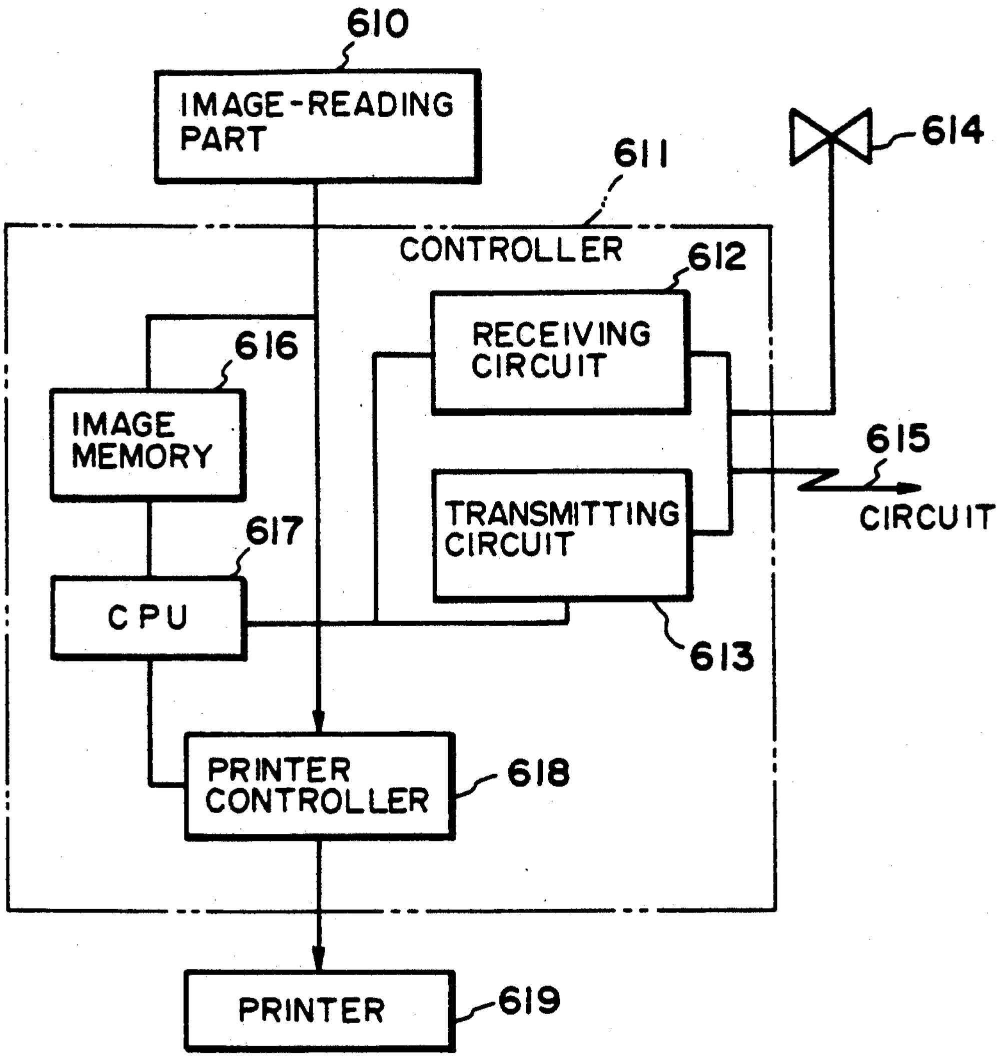
FIG. 6 is a block diagram showing a system constituting a facsimile apparatus.

In a case where the image forming apparatus according to the present invention is used as a printer for facsimile, the laser light 505 may be replaced by exposure light image for printing received data. FIG. 6 is a block diagram for illustrating such an embodiment.

Referring to FIG. 6, a controller 611 controls an image reader (or image reading unit) 610 and a printer 619. The entirety of the controller 611 is regulated by a CPU 617. Data read from the image reader 610 is transmitted through a transmitter circuit 613 to a remote terminal such as another facsimile machine. On the other hand, data received from a remote terminal is transmitted through a receiver circuit 612 to a printer 619. An image memory 616 stores prescribed image data. A printer controller 618 controls the printer 619. A telephone handset 614 is connected to the receiver circuit 612 and the transmitter circuit 613.

More specifically, an image received from a line (or circuit) 615 (i.e., image data received a remote terminal connected by the line) is demodulated by means of the receiver circuit 612, decoded by the CPU 617, and sequentially stored in the image memory 616. When image data corresponding to at least one page is stored in the image memory 616, image recording or output is effected with respect to the corresponding page. The CPU 617 reads image data corresponding to one page from the image memory 616, and transmits the decoded data corresponding to one page to the printer controller 618. When the printer controller 618 receives the image data corresponding to one page from the CPU 617, the printer controller 618 controls the printer 619 so that image data recording corresponding to the page is effected. During the recording by the printer 619, the CPU 617 receives another image data corresponding to the next page.

Thus, receiving and recording of an image may be effected by means of the apparatus shown in FIG. 6 in the above-mentioned manner.

The present invention will be explained in more detail with reference to Examples, by which the present invention is not limited at all. In the formulations appearing in the Examples, parts are parts by weight.

SYNTHESIS EXAMPLE 1

200 parts of cumene was charged in a reaction vessel and heated to a reflux temperature. Further, into the vessel, 85 parts of styrene monomer, 15 parts of acrylic acid monomer and 8.5 parts of di-tert-butyl peroxide were added. The solution polymerization was completed under refluxing of the cumene (146°-156° C.), followed by distilling-off of the cumene by raising the temperature. The resultant styrene-acrylic acid copolymer was soluble in THF and showed parameters: Mw (weight-average molecular weight)=3,500, Mw/Mn (weight-average molecular weight/number-average molecular weight)=2.52, the molecular weight at the main peak in the GPC chart=3,000, and Tg (glass transition point)=56° C.

30 parts of the above copolymer was dissolved in the following monomer mixture to form a mixture solution.

| [Monomer mixture] | |
|---|---|
| Styrene monomer | 50 parts |
| n-Butyl acrylate monomer | 17 parts |
| Acrylic acid monomer | 3 parts |
| Divinylbenzene | 0.26 part |
| Benzoyl peroxide | 1 part |
| tert-Butylperoxy-2-ethylhexanoate | 0.7 part |

To the above mixture solution was added 170 parts of water containing 0.1 part of incompletely saponified polyvinyl alcohol to form a liquid suspension. The suspension was added to a nitrogen-aerated reaction vessel containing 15 parts of water and subjected to 6 hours of suspension polymerization at 70°-95° C.

After the reaction, the product was recovered by filtration, de-watered and dried to form a copolymer composition. In the composition, styrene-acrylic acid copolymer and styrene-n-butyl acrylate copolymer were uniformly mixed. The THF-soluble content of the resin composition was subjected to measurement of molecular weight distribution by GPC to provide peaks at molecular weights of about 3500 and about 31000 in the GPC chart, Mn (number-average molecular weight)=5100, Mw=115000, Mw/Mn=22.5 and a content of molecular weight being 10000 or below of 27 wt. %. The resin showed a Tg of 59° C., and the content of molecular weight being 10,000 or below isolated by GPC showed a glass transition point Tg1 of 57° C.

The copolymer resin showed an acid value of 22.0.

SYNTHESIS EXAMPLE 2

The following monomer mixture was subjected to solution polymerization in 200 parts of cumene at a cumene reflux temperature.

| [Monomer mixture] | |
|---|---|
| Styrene monomer | 90 parts |
| n-Butyl maleate (half ester) monomer | 10 parts |
| di-tert-Butyl peroxide | 8.5 parts |

After the reaction, cumene was removed by heating. The resultant styrene-n-butyl acrylate copolymer showed parameters: Mw=6,900, Mw/Mn=2.36, a main peak molecular-weight=7200 and Tg=64° C.

30 parts of the above styrene-n-butyl maleate (half ester) copolymer was dissolved in the following monomer mixture and subjected to polymerization in the same manner as in Synthesis Example 1 to form a resin composition comprising styrene-n-butyl maleate (half ester) copolymer and styrene-n-butyl acrylate-n-butyl maleate (half ester) copolymer. The resin showed an acid value of 20.6.

| [Monomer mixture] | |
|---|---|
| Styrene | 45 parts |
| n-Butyl acrylate | 20 parts |
| n-Butyl maleate (half ester) | 5 parts |
| Divinylbenzene | 0.25 part |
| Benzoyl peroxide | 0.65 part |
| tert-Butylperoxide-ethylhexanoate | 0.85 part |

SYNTHESIS EXAMPLE 3

200 parts of cumene was charged in a reaction vessel and heated to a reflux temperature. Into the vessel, a mixture of 78 parts of styrene, 15 parts of n-butyl acrylate, 7 parts of n-butyl maleate (half ester), 0.3 part of divinylbenzene and 1.0 part of ditert-butyl peroxide was added dropwise in 4 hours under reflux of the cumene, followed by 4 hours of polymerization and removal of the solvent by ordinary distillation under reduced pressure to obtain a copolymer. The polymer showed: $Mw=25\times10^4$, Mw/Mn=11.0, Tg=60° C., and an acid value of 19.5.

COMPARATIVE SYNTHESIS EXAMPLE 1

A copolymer was obtained in the same manner as in Synthesis Example 3 except that 82 parts of styrene and 18 parts of n-butyl acrylate were used and n-butyl maleate (half ester) was omitted. The copolymer showed an acid value of 0.4.

SYNTHESIS EXAMPLE 4

A copolymer was obtained in the same manner as in Synthesis Example 3 except that the amount of the styrene was changed to 82 parts and the amount of the n-butylmaleate (half ester) was changed to 3 parts. The copolymer showed an acid value of 7.3.

SYNTHESIS EXAMPLE 5

A copolymer was obtained in the same manner as in Synthesis Example 3 except that the amount of the styrene was changed to 70 parts and the amount of the n-butylmaleate (half ester) was changed to 15 parts. The copolymer showed an acid value of 48.

PRODUCTION EXAMPLE 1

| | |
|---|---|
| Resin composition of Synthesis Example 1 | 100 parts |
| Magnetic fine powder (BET value = 8.6 $m^2/g$) | 100 parts |
| Negatively chargeable control agent (chromium complex of monoazo dye) | 1.1 part |
| Low-molecular weight polypropylene (Mw = 6000) | 3 parts |

The above components were melt-kneaded by means of a twin-screw extruder heated up to 140° C., and the kneaded product, after cooling, was coarsely crushed by means of a hammer mill, and then finely pulverized by means of a jet mill. The finely pulverized product was classified by means of a windforce classifier to obtain a classified powder product. Ultra-fine powder and coarse power were simultaneously and precisely removed from the classified powder by means of a multi-division classifier utilizing a Coanda effect (Elbow Jet Classifier available from Nittetsu Kogyo K.K.), thereby to obtain a negatively chargeable insulating magnetic toner (I) (Tg=57° C.) having a volume-average particle size of 6.4 microns.

PRODUCTION EXAMPLE 2

| | |
|---|---|
| Resin composition of Synthesis Example 2 | 100 parts |
| Magnetic fine powder (BET value = 8.6 $m^2/g$) | 110 parts |
| Negatively chargeable control agent (chromium complex of monoazo dye) | 1.1 part |

-continued

| | |
|---|---|
| Low-molecular weight polypropylene (Mw = 6000) | 3 parts |

Negatively chargeable insulating magnetic toners (II) and (III) having different average particle sizes as show in Table 1 appearing hereinafter were prepared from the above ingredients otherwise in a similar manner as in Production Example 1.

PRODUCTION EXAMPLE 3

| | |
|---|---|
| Resin composition of Synthesis Example 3 | 100 parts |
| Magnetic fine powder (BET value = 8.6 $m^2/g$) | 80 parts |
| Negatively chargeable control agent (chromium complex of monoazo dye) | 1.1 part |
| Low-molecular weight polypropylene (Mw = 6000) | 3 parts |

A negatively chargeable insulating magnetic toner (IV) was prepared from the above ingredients otherwise in a similar manner as in Production Example 1.

PRODUCTION EXAMPLES 4 and 5

Negatively chargeable insulating magnetic toners (V) and (VI) were prepared by using the resin compositions of Synthesis Examples 4 and 5 in place of the resin composition of Synthesis Example 3 otherwise in a similar manner as in Production Example 1.

COMPARATIVE PRODUCTION EXAMPLE 1

| | |
|---|---|
| Resin composition of Comparative Synthesis Example 1 | 100 parts |
| Magnetic fine powder (BET value = 7.7 $m^2/g$) | 90 parts |
| Negatively chargeable control agent (chromium complex of salicylic acid) | 1.1 part |
| Low-molecular weight polypropylene (Mw = 6000) | 3 parts |

A negatively chargeable insulating magnetic toner (VII) (Tg=55° C.) was prepared from the above ingredients otherwise in a similar manner as in Production Example 1.

The particle size distributions of the above-obtained toners (I)-(VII) are shown in the following Table 1.

TABLE 1

| | Toner particle size distribution | | | | |
|---|---|---|---|---|---|
| Toner No. | Number % of ≦5 μm | Volume % of ≧12.7 μm | Number % of 6.35-10.08 μm | Volume average size (μm) | Number %/Volume % of ≦5 μm |
| I | 42.3 | 0 | 24.0 | 6.4 | 2.3 |
| II | 38.1 | 0.6 | 30.5 | 6.9 | 2.9 |
| III | 7.4 | 18.8 | 47.3 | 12.4 | 21.6 |
| IV | 27.5 | 1.1 | 38.0 | 7.8 | 3.4 |
| V | 30.6 | 0 | 35.5 | 7.0 | 3.0 |
| VI | 31.4 | 0 | 36.2 | 7.2 | 3.1 |
| VII | 32.6 | 0 | 34.4 | 6.8 | 2.8 |

EXAMPLES 1-8 AND COMPARATIVE EXAMPLES 1-4

The above-prepared magnetic toners were blended with negatively chargeable true-spherical resin particles as shown in Table 2 below each having a long axis/- short axis ratio of approx. 1 and hydrophobic or non-treated silica particles as shown in Table 3 by means of a Henschel mixer to prepare developers of these Examples as shown in Table 5 below.

Each developer was charged in an image forming apparatus (LBP-8II, mfd. by Canon K.K.) remodelled to be equipped with a contact charging device as shown in FIG. 1. A DC voltage (−700 V) and an AC voltage (600 Hz, 2000 Vpp) were applied in superposition to the contact-charging device, and a successive image forming test was performed so as to form 16 copies per minute in a reversal development mode under normal temperature—normal humidity conditions (25° C., 60% RH).

The contact charging and image formation were performed more specifically as follows with reference to FIG. 1.

As described above, the charging roller 2 had a diameter of 12 mm and comprised a 5 mm-dia. core metal *2a* coated with an approx. 3.5 mm-thick electroconductive rubber layer *2b* and further with a 20 micron-thick releasable film 2C of methoxymethylated nylon. The charging roller 2 was pressed against the OPC photosensitive member 1 so as to exert a total pressure of 1.2 kg (linear pressure of 55 g/cm).

The outline of the image forming apparatus is illustrated in FIG. 5. In the apparatus, a toner layer was formed in a thickness of 130 microns on the sleeve 504, and the sleeve 504 was disposed at a minimum spacing of 300 microns from the OPC photosensitive drum 501 and the image formation test was performed under application of a DC bias of −500 V and an AC bias of 1800 Hz and 1600 Vpp to the sleeve.

Figure 7:
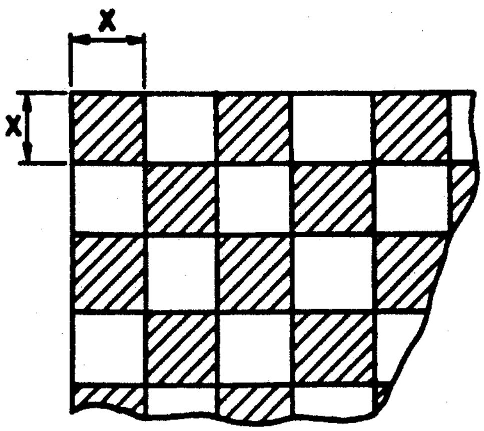
FIG. 7 is an illustration of a checker pattern for evaluating reproducibility of minute dots.

The results of the image forming test are summarized in Table 5 below. In Table 5 , the image density represents an average of values measured at 5 points in a 5 mm×5 mm solid black square image. The minute dot reproducibility represents the reproducibility of a checker pattern as shown in FIG. 7 including 100 unit square dots each having one side×measuring 80 microns or 50 microns as shown in FIG. 7, whereby the reproducibility was evaluated by observation through a microscope while noticing the clarity (presence or absence of defects) and scattering to the non-image parts. The toner sticking onto the OPC photosensitive member was evaluated by observing the resultant toner images and the surface state of the OPC photosensitive member (having a surface abrasion characteristic in terms of an abrasion decrease of $2.5\times10^{-2}$ $cm^3$ by a Taber Abraser) after 10,000 sheets of image formation.

Table 2 below summarizes the properties of the negatively chargeable resin particles, Table 3 summarizes the properties of the hydrophobic silica, Table 4 summarizes the properties of the developers, and Table 5 summarizes the compositions and evaluation results of the developers. The evaluation standards are shown below.

Fog o: Substantially no.
Δ: Observed but practically acceptable.
x: Practically unacceptable.

Toner sticking onto photosensitive member o: No sticking at all.
oΔ: 1-3 white voids in A4 size solid black image attributable to toner sticking.
Δ: 4-10 white voids in A4 size solid black image.
x: More than 10 white voids in A4 size solid black image.

Dot reproducibility o: Less than 2 defects.
oΔ: 3-5 defects.
Δ: 6-10 defects.
x: 11 or more defects.

TABLE 2

| | Negatively chargeable resin particles | | | | |
|---|---|---|---|---|---|
| | Particle size (μm) | Volume resistivity (ohm · cm) | Tribo-electric charge (μC/g) | Tg (°C.) | Composition |
| A-1 | 0.5 | $10^{11}$ | −200 | 101 | Styrene-acrylic acid-2-ethylhexyl acrylate |
| A-2 | 0.15 | $10^{10}$ | −300 | 114 | Styrene-methyl methacrylate-acrylic acid-butylacrylate |
| A-3 | 0.06 | $10^{8}$ | −80 | 92 | Styrene-acrylic acid-2-ethylhexyl acrylate-divinylbenzene |
| A-4 | 0.5 | $10^{6}$ | −70 | 90 | Styrene-acrylic acid-2-ethylhexyl acrylate-divinylbenzene |
| A-5 | 0.5 | $10^{10}$ | −160 | 105 | Styrene-acrylic acid-2-ethylhexyl acrylate-divinylbenzene |
| A-6 | 1.5 | $10^{14}$ | −450 | 92 | Styrene-acrylic acid-2-ethylhexyl acrylate-divinylbenzene |
| A-7 | 0.55 | $10^{4}$ | −30 | 65 | Styrene-acrylic acid-2-ethylhexyl acrylate-divinylbenzene |

TABLE 3

| | Silica (B) | | | |
|---|---|---|---|---|
| | BET value ($m^2$/g) | Triboelectric charge (μC/g) | Hydrophobicity (%) | Treating agent |
| B-1 | 200 | −180 | 93 | Alkyl-modified silicone oil |
| B-2 | 300 | −250 | 98 | Hexamethyldisilazane and then silicone oil. |
| B-3 | 200 | −30 | Totally wettable | None |

TABLE 4

| Example No. | Magnetic toner 100 parts | Externally added agents: Silica powder | | Negatively chargeable resin particles | | Developer properties: BET value ($m^2$/g) | Loose apparent density (g/cm) | True density (g/$cm^3$) |
|---|---|---|---|---|---|---|---|---|
| Ex. 1 | (I) | B-1 | 0.8 part | A-1 | 0.3 part | 2.5 | 0.48 | 1.67 |
| Ex. 2 | (I) | B-2 | 1.0 part | A-2 | 0.1 part | 2.6 | 0.48 | 1.67 |
| Ex. 3 | (I) | B-2 | 1.2 part | A-3 | 0.05 part | 2.8 | 0.47 | 1.67 |

TABLE 4-continued

| Example No. | Magnetic toner 100 parts | Externally added agents Silica powder | | Negatively chargeable resin particles | | Developer properties BET value ($m^2/g$) | Loose apparent density (g/cm) | True density ($g/cm^3$) |
|---|---|---|---|---|---|---|---|---|
| Ex. 4 | (II) | B-1 | 1.6 part | A-4 | 0.2 part | 3.1 | 0.46 | 1.69 |
| Ex. 5 | (II) | B-2 | 1.6 part | A-5 | 0.7 part | 3.2 | 0.46 | 1.58 |
| Ex. 6 | (IV) | B-2 | 0.6 part | A-1 | 0.3 part | 2.4 | 0.49 | 1.62 |
| Ex. 7 | (V) | B-1 | 1.4 part | A-1 | 0.1 part | 3.2 | 0.48 | 1.67 |
| Ex. 8 | (VI) | B-1 | 1.4 part | A-1 | 0.1 part | 3.1 | 0.49 | 1.67 |
| Comp. Ex. 1 | (VII) | B-3 | 0.9 part | A-6 | 0.3 part | 2.6 | 0.48 | 1.67 |
| Comp. Ex. 2 | (I) | B-3 | 0.8 part | — | 0 part | 2.5 | 0.48 | 1.67 |
| Comp. Ex. 3 | (II) | B-3 | 0.5 part | A-7 | 1.2 part | 3.7 | 0.53 | 1.69 |
| Comp. Ex. 4 | (III) | B-3 | 0.5 part | A-1 | 0.1 part | 2.4 | 0.53 | 1.69 |

TABLE 5

| Example No. | Image density | Fog | Dot reproducibility x = 80μ | x = 50μ | Toner sticking (10000 sheets) |
|---|---|---|---|---|---|
| Ex. 1 | 1.4 | o | o | o | oΔ |
| Ex. 2 | 1.4 | o | o | o | oΔ |
| Ex. 3 | 1.4 | o | o | o | oΔ |
| Ex. 4 | 1.4 | o | o | o | o |
| Ex. 5 | 1.35 | Δ | o | o | o |
| Ex. 6 | 1.4 | o | o | oΔ | oΔ |
| Ex. 7 | 1.4 | o | o | o | oΔ |
| Ex. 8 | 1.4 | o | o | o | oΔ |
| Comp. Ex. 1 | 0.9 | o | o | o | x |
| Comp. Ex. 2 | 0.8 | o | Δ | Δ | x |
| Comp. Ex. 3 | 0.9 | x | o | Δ | x |
| Comp. Ex. 4 | 0.8 | o | Δ | x | Δ |

PRODUCTION EXAMPLE 6

| | |
|---|---|
| Resin composition of Synthesis Example 1 | 100 parts |
| Magnetic fine powder (BET value = 8.6 $m^2/g$) | 60 parts |
| Negatively chargeable control agent (chromium complex of monoazo dye) | 1 part |
| Low-molecular weight polypropylene (Mw = 6000) | 3 parts |

The above components were melt-kneaded by means of a twin-screw extruder heated up to 140° C., and the kneaded product, after cooling, was coarsely crushed by means of a hammer mill, and then finely pulverized by means of a jet mill. The finely pulverized product was classified by means of a windforce classifier to obtain a negatively chargeable insulating magnetic toner (VIII) (Tg=57°) having a volume-average particle size of 12 microns.

PRODUCTION EXAMPLE 7

| | |
|---|---|
| Resin composition of Synthesis Example 2 | 100 parts |
| Magnetic fine powder (BET value = 8.6 $m^2/g$) | 60 parts |
| Negatively chargeable control agent (chromium complex of monoazo dye) | 1 part |
| Low-molecular weight polypropylene (Mw = 6000) | 3 parts |

A magnetic toner (IX) was prepared from the above ingredients otherwise in a similar manner as in Production Example 6.

PRODUCTION EXAMPLE 8

| | |
|---|---|
| Resin composition of Synthesis Example 3 | 100 parts |
| Magnetic fine powder (BET value = 8.6 $m^2/g$) | 60 parts |
| Negatively chargeable control agent (chromium complex of monoazo dye) | 1 part |
| Low-molecular weight polypropylene (Mw = 6000) | 3 parts |

A magnetic toner (X) was prepared from the above ingredients otherwise in a similar manner as in Production Example 6.

COMPARATIVE PRODUCTION EXAMPLE 2

| | |
|---|---|
| Resin composition of Comparative Synthesis Example 1 | 100 parts |
| Magnetic fine powder (BET value = 7.7 $m^2/g$) | 60 parts |
| Negatively chargeable control agent (chromium complex of salicylic acid) | 3 parts |
| Low-molecular weight polyporpylene (Mw = 6000) | 3 parts |

A magnetic toner (XI) was prepared from the above ingredients otherwise in a similar manner as in Production Example 6.

PRODUCTION EXAMPLES 10 and 11

Negatively chargeable insulating magnetic toners (XII) and (XIII) were prepared by using the resin compositions of Synthesis Examples 4 and 5 in place of the resin composition of Synthesis Example 3 otherwise in a similar manner as in Production Example 8.

EXAMPLES 9-17 COMPARATIVE EXAMPLES 5-7

The above-prepared negatively chargeable insulating magnetic toners (VIII)-(XIII) were blended with the negatively chargeable true-spherical resin particles as shown in Table 2 above and hydrophobic or non-treated silica particles shown in Table 3 by means of a Henschel mixer to prepare developers of these Examples as shown in Table 6 below.

Each developer was charged in an image forming apparatus (LBP-8II, mfd. by Canon K.K.) remodelled to be equipped with a contact charging device as shown in FIG. 1 or FIG. 2. A DC voltage (−700 V) and an AC voltage (600 Hz, 1500 Vpp) were applied in superposition to the contact-charging device, and a successive image forming test was performed at a printing speed of 16 sheets (A4) per minute in a reversal development mode under normal temperature—normal humidity conditions (25° C., 60% RH), whereby the printed-out images were evaluated. The surface states of the charging member and the photosensitive drum were also observed. The charging member was a roller-type as shown in FIG. 1 in all the cases except that a blade-type as shown in FIG. 2 was used in Example 15.

The compositions of the developers and the evaluation results are summarized in Table 6 below.

TABLE 6

| Example No. | Magnetic toner 100 parts | Silica | | Negatively chargable resin particles | | Image density (initial) | Fog (initial) | Toner sticking (after 10000 sheets) |
|---|---|---|---|---|---|---|---|---|
| Ex. 9 | VIII | B-1 | 0.5 part | A-1 | 0.1 part | 1.4 | o | oΔ |
| Ex. 10 | VIII | B-1 | 0.5 part | A-2 | 0.05 part | 1.4 | o | oΔ |
| Ex. 11 | VIII | B-2 | 0.4 part | A-3 | 0.1 part | 1.4 | o | oΔ |
| Ex. 12 | IX | B-2 | 0.6 part | A-4 | 0.4 part | 1.35 | o | o |
| Ex. 13 | IX | B-2 | 1.0 part | A-5 | 0.8 part | 1.25 | o | o |
| Ex. 14 | X | B-1 | 1.0 part | A-1 | 0.2 part | 1.4 | o | oΔ |
| Ex. 15 | X | B-2 | 0.8 part | A-2 | 0.3 part | 1.35 | o | oΔ |
| Ex. 16 | XII | B-2 | 0.8 part | A-1 | 0.1 part | 1.4 | o | oΔ |
| Ex. 17 | XIII | B-2 | 0.8 part | A-1 | 0.1 part | 1.4 | o | oΔ |
| Comp. Ex. 5 | VIII | B-3 | 0.5 part | A-6 | 0.2 part | 1.0 | x | Δ |
| Comp. Ex. 6 | XI | B-3 | 0.5 part | A-7 | 0.2 part | 1.0 | Δ | x |
| Comp. Ex. 7 | XI | B-3 | 0.5 part | — | 0 part | 0.8 | Δ | x |

PRODUCTION EXAMPLE 12

| | |
|---|---|
| Styrene-n-butyl acrylate copolymer (copolymerization weight ratio = 8:2, Mw = 25 × $10^4$) | 100 parts |
| Magnetic fine powder (BET value = 8.6 $m^2/g$) | 60 parts |
| Negatively chargeable control agent (chromium complex of monoazo dye) | 1 part |
| Low-molecular weight polypropylene (Mw = 6000) | 3 parts |

The above components were melt-kneaded by means of a twin-screw extruder heated up to 140° C., and the kneaded product, after cooling, was coarsely crushed by means of a hammer mill, and then finely pulverized by means of a jet mill. The finely pulverized product was classified by means of a windforce classifier to obtain a negatively chargeable insulating magnetic toner (XIV) (Tg=60° C.) having a volume-average particle size of 12 microns.

PRODUCTION EXAMPLE 13

| | |
|---|---|
| Styrene-2-ethylhexyl acrylate copolymer (copolymerization ratio = 8.2, Mw = 20 × $10^4$) | 100 parts |
| Magnetic fine powder (BET value = 7.7 $m^2/g$) | 60 parts |
| Negatively chargeable control agent (chromium complex of | 1.1 part |

-continued

| | |
|---|---|
| salicylic acid) | |
| Low-molecular weight polypropylene (Mw = 6000) | 3 parts |

A magnetic toner (XV) (Tg=55° C.) was prepared from the above ingredients otherwise in a similar manner as in Production Example 12.

EXAMPLES 18-24 AND COMPARATIVE EXAMPLES 8-14

The above prepared magnetic toners XIV and XV were blended with the negatively chargeable resin particles shown in Table 2 above, hydrophobic or non-treated silica particles shown in Table 7 and aliphatic acid metal salt particles shown in Table 8 below to prepare developers of these examples as shown in Table 8.

Each developer was charged in an image forming apparatus (LBP-8II, mfd. by Canon K.K.) remodelled to be equipped with a contact charging device as shown in FIG. 1. A DC voltage (−700 V) and an AC voltage (600 Hz, 2000 Vpp) were applied in superposition to the contact-charging device, and a successive image forming test was performed so as to form 16 copies per minute in a reversal development mode under normal temperature—normal humidity conditions (25° C., 60% RH), whereby the printed-out images were evaluated. The surface states of the charging member and the photosensitive drum were also observed. The charging member was a roller-type as shown in FIG. 1 in all the cases except that a blade-type as shown in FIG. 2 was used in Example 24.

The compositions of the developers and the evaluation results are summarized in Table 8 below.

TABLE 7

| | Silica (B) | | | |
|---|---|---|---|---|
| | BET value ($m^2/g$) | Triboelectric charge (μC/g) | Hydrophobicity (%) | Treating agent |
| B-4 | 200 | −250 | 98 | Hexamethyldisilazane and then silicone oil |
| B-5 | 300 | −230 | 98 | Hexamethyldisilazane |
| B-6 | 200 | −30 | Totally wettable | None |

TABLE 8

| Example No. | Magnetic toner 100 parts | Silica (part) | | Negative resin particles (part) | | Aliphatic acid metal salt powder (part) | | Image density (initial) | Fog (initial) | Toner sticking after 500 sheets | Toner sticking (After 10000 sheets) |
|---|---|---|---|---|---|---|---|---|---|---|---|
| Ex. 18 | XIV | B-4 | 0.5 | A-1 | 0.1 | Zinc stearate | 0.1 | 1.4 | o | o | o |
| Ex. 19 | " | " | 0.8 | A-2 | 0.2 | " | 0.15 | 1.4 | o | o | o |
| Ex. 20 | " | " | 0.5 | A-3 | 0.1 | " | 0.1 | 1.35 | o | o | o |
| Ex. 21 | " | " | 0.5 | A-4 | 0.3 | " | 0.1 | 1.3 | o | o | o |
| Ex. 22 | " | " | 0.5 | A-5 | 0.1 | " | 0.1 | 1.4 | o | o | o |
| Ex. 23 | " | " | 0.5 | A-1 | 0.2 | Zinc laurate | 0.1 | 1.4 | o | o | o |
| Ex. 24 | XV | " | 0.5 | A-1 | 0.2 | Aluminum stearate | 0.1 | 1.4 | o | o | o |
| Comp. Ex. 8 | XIV | B-6 | 0.5 | A-6 | 0.1 | Zinc stearate | 0.1 | 1.0 | x | Δ | x |
| Comp. Ex. 9 | " | " | 0.5 | A-7 | 0.1 | " | 0.1 | 1.0 | o | Δ | x |
| Comp. Ex. 10 | " | " | 0.5 | — | | — | | 0.7 | Δ | x | x |
| Comp. Ex. 11 | " | " | 0.5 | A-1 | 0.2 | — | | 1.0 | o | x | x |
| Comp. Ex. 12 | " | " | 0.5 | — | | Zinc stearate | 0.1 | 1.0 | o | x | Δ |
| Comp. Ex. 13 | " | " | 0.5 | A-1 | 0.4 | " | 0.4 | 1.0 | x | o | o* |
| Comp. Ex. 14 | " | " | 0.5 | A-1 | 0.1 | " | 0.1 | 1.4 | o | o | x |

*Image irregularity

EXAMPLES 25-29 AND COMPARATIVE EXAMPLES 15-17

The above prepared magnetic toners XIV and XV were blended with the negatively chargeable resin particles shown in Table 2 above, and the hydrophobic or non-treated silica particles shown in Table 3 above to prepare developers of these examples as shown in Table 9 below.

Each developer was charged in an image forming apparatus (LBP-8II, mfd. by Canon K.K.) remodelled to be equipped with a contact charging device as shown in FIG. 1 or FIG. 2. A DC voltage (−700 V) and an AC voltage (300 Hz, 1500 Vpp) were applied in superposition to the contact-charging device, and a successive image forming test was performed at a printing speed of 8 sheets (A4) per minute in a reversal development mode under normal temperature—normal humidity conditions (25° C., 60% RH), whereby the printed-out images were evaluated. The surface states of the charging member and the photosensitive drum were also observed. The charging member was a roller-type as shown in FIG. 1 in all the cases except that a blade-type as shown in FIG. 2 was used in Example 29.

The compositions of the developers and the evaluation results are summarized in Table 9 below.

TABLE 9

| Example No. | Magnetic toner 100 parts | Silica (part) | | Negatively chargable resin particles (part) | | Image density (initial) | Fog (initial) | Toner sticking (after 6000 sheets) |
|---|---|---|---|---|---|---|---|---|
| Ex. 25 | XIV | B-1 | 0.5 | A-1 | 0.1 | 1.4 | o | o |
| Ex. 26 | " | " | 0.5 | A-2 | 0.05 | 1.4 | o | oΔ |
| Ex. 27 | " | B-2 | 0.4 | A-3 | 0.1 | 1.4 | o | o |
| Ex. 28 | XV | " | 0.6 | A-4 | 0.4 | 1.35 | o | o |
| Ex. 29 | " | " | 1.0 | A-5 | 0.8 | 1.2 | o | o |
| Comp. Ex. 15 | XIV | B-3 | 0.5 | A-6 | 0.2 | 1.0 | x | Δ |
| Comp. Ex. 16 | " | " | 0.5 | A-7 | 0.2 | 0.9 | o | x |
| Comp. Ex. 17 | " | " | 0.5 | — | 0 | 0.8 | o | x |

PRODUCTION EXAMPLE 14

| | |
|---|---|
| Styrene-n-butyl acrylate copolymer (copolymerization weight ratio = 8.2, Mw = 25 × $10^4$) | 100 parts |
| Magnetic fine powder (BET value = 8.6 $m^2/g$) | 100 parts |
| Negatively chargeable control agent (chromium complex of monoazo dye) | 1 part |

-continued

| | |
|---|---|
| Low-molecular weight polypropylene (Mw = 6000) | 3 parts |

The above components were melt-kneaded by means of a twin-screw extruder heated up to 140° C., and the kneaded product, after cooling, was coarsely crushed by means of a hammer mill, and then finely pulverized by means of a jet mill. The finely pulverized product was classified by means of a windforce classifier to obtain a classified powder product. Ultra-fine powder and coarse power were simultaneously and precisely removed from the classified powder by means of a multi-division classifier utilizing a Coanda effect (Elbow Jet Classifier available from Nittetsu Kogyo K.K.), thereby to obtain a negatively chargeable insulating magnetic toner (XVI) (Tg=60° C.) having a volume-average particle size of 6.5 microns.

PRODUCTION EXAMPLE 15

| | |
|---|---|
| Styrene-2-ethylhexyl acrylate copolymer (copolymerization ratio = 8.2, Mw = 20 × $10^4$) | 100 parts |
| Magnetic fine powder (BET value = 7.7 $m^2/g$) | 100 parts |
| Negatively chargeable control agent (chromium complex of salicylic acid) | 3 parts |
| Low-molecular weight polypropylene (Mw = 6000) | 3 parts |

A negatively chargeable insulating magnetic toner (XVII) having a volume-average particle size of 6.7 microns and Tg of 55° C. was prepared from the above ingredients otherwise in a similar manner as in Production Example 4.

PRODUCTION EXAMPLE 16

A negatively chargeable magnetic toner (XVIII) having a volume-average particle size of 7.8 microns was prepared in a similar manner as in Production Example 14 except that the amount of the magnetic fine powder was reduced to 80 parts.

PRODUCTION EXAMPLE 17

A negatively chargeable magnetic toner (XIX) was prepared in a similar manner as in Production Example 14 except that the classification condition was varied to provide a particle size distribution as shown in Table 10 below.

The particle size distributions of the toners (XVI)-(XVIII) are also shown in Table 10 below.

Further, silica particles used together with these toners are shown in Table 11 below.

TABLE 10

| Toner No. | Toner particle size distribution Number % of ≦5 μm | Volume % of ≧12.7 μm | Number % of 6.35-10.08 μm | Volume average size (μm) | Number %/Volume % of ≦5 μm |
|---|---|---|---|---|---|
| XVI | 35.2 | 0 | 38.5 | 6.5 | 3.96 |
| XVII | 39.0 | 0 | 29.0 | 6.7 | 2.73 |
| XVIII | 33.0 | 1.2 | 38.9 | 7.8 | 3.87 |
| XIX | 62.3 | 0 | 14.4 | 6.1 | 2.1 |

TABLE 11

| | Silica (B) BET value ($m^2/g$) | Triboelectric charge (μC/g) | Hydrophobicity (%) | Treating agent |
|---|---|---|---|---|
| B-7 | 200 | −170 | 93 | Hexamethyldisilazane |
| B-8 | 300 | −230 | 95 | Hexamethyldisilazane |
| B-9 | 200 | −30 | Totally wettable | None |

EXAMPLE 30

100 parts of the above-prepared magnetic toner XVI was blended with 0.2 part of the negatively chargeable resin particles A-1 shown in Table 2 and 1.0 parts of the hydrophobic silica B-7 shown in Table 11 above by means of a Henschel mixer to obtain a developer, the properties of which are shown in Table 12 appearing hereinafter.

The developer was charged in an image forming apparatus (LBP-8II, mfd. by Canon K.K.) remodelled to be equipped with a contact charging device as shown in FIG. 1. A DC voltage (−700 V) and an AC voltage (300 Hz, 1500 Vpp) were applied in superposition to the contact-charging device, and a successive image forming test was performed at a printing speed of 8 sheets (A4) per minute in a reversal development mode under normal temperature—normal humidity conditions (25° C., 60% RH), whereby the printed-out images were evaluated. The results are also shown in Table 12. The evaluation standards of the image density Dmax, dot reproducibility and fog were the same as in Table 5. The toner sticking was evaluated by observing the resultant toner images and the surface state of the OPC photosensitive member (having a surface abrasion characteristic in terms of an abrasion decrease of $2.5\times10^{-2}$ $cm^3$ by a Taber abraser) after 6000 sheets of image formation.

As a result of the evaluation, the developer showed an excellent minute-dot reproducibility and provided good images having an image density Dmax of 1.4 without fog as shown in Table 12. Further, no sticking onto the photosensitive member was observed after image formation of 6000 sheets.

EXAMPLE 31

A developer was prepared in the same manner as in Example 30 except that the negatively chargeable resin particles were changed to the type A-2 in an amount of 0.05 part. The developer was evaluated in the same manner as in Example 30 except that the image formation was effected by using an image forming apparatus (LBP-8II), mfd. by Canon K.K.) remodelled to be equipped with a contact-charging device as shown in FIG. 2.

As shown in Table 12 , the developer showed an excellent minute-dot reproducibility and provided good images at Dmax of 1.4 free from fog. Slight toner sticking onto the photosensitive member was observed after 6000 sheets of the image formation but was practically of almost no problem.

EXAMPLES 32-36

Developers of these Examples were prepared in the same manner as in Example 30 except that the formulations were changed as shown in Table 12. The physical properties of the developers are also shown in Table 12. These developers were respectively evaluated in the same manner as in Example 30, whereby similarly good results as in Example 30 were obtained as shown in Table 12.

COMPARATIVE EXAMPLES 18-20

For the purpose of comparison with Examples, developers of these Comparative Examples were prepared in the same manner as in Example 30 except that the formulations were changed as shown in Table 12. The physical properties of the developers are also shown in Table 12. These developers were respectively evaluated in the same manner as in Example 30, whereby they showed inferior results in any respects than those of Examples and failed to show satisfactory performances as shown in Table 12.

TABLE 12

| Example No. | External blend formulation: Magnetic toner 100 parts | Silica type | Silica part | Negative particles type | Negative particles part | Developer properties: BET value ($m^2/g$) | Loose apparent density ($g/cm^3$) | True density ($g/cm^3$) | Image evaluation (initial): Image density | Fog | Dot reproducibility x = 80μ | Dot reproducibility x = 50μ | Toner sticking (after 6000 sheets) |
|---|---|---|---|---|---|---|---|---|---|---|---|---|---|
| Ex. 30 | XVI | B-7 | 1.0 | A-1 | 0.2 | 2.5 | 0.48 | 1.67 | 1.4 | o | o | o | o |
| Ex. 31 | XVI | B-7 | 1.0 | A-2 | 0.05 | 2.4 | 0.48 | 1.67 | 1.4 | o | o | o | o |
| Ex. 32 | XVI | B-7 | 1.0 | A-3 | 0.2 | 2.5 | 0.48 | 1.67 | 1.4 | o | o | o | o |
| Ex. 33 | XVII | B-8 | 1.0 | A-4 | 0.2 | 2.8 | 0.46 | 1.67 | 1.35 | o | o | o | o |
| Ex. 34 | XVII | B-7 | 1.5 | A-5 | 0.8 | 3.0 | 0.46 | 1.67 | 1.3 | o | o | o | o |
| Ex. 35 | XVIII | B-7 | 0.8 | A-1 | 0.2 | 2.3 | 0.50 | 1.57 | 1.4 | o | o | oΔ | o |
| Ex. 36 | XIX | B-7 | 1.0 | A-1 | 0.2 | 3.0 | 0.52 | 1.67 | 1.3 | Δ | o | oΔ | oΔ |
| Comp. Ex. 18 | XVI | B-9 | 1.0 | A-6 | 0.4 | 2.5 | 0.48 | 1.67 | 1.0 | x | o | o | Δ |
| Comp. Ex. 19 | XVI | B-9 | 1.0 | A-7 | 0.4 | 2.5 | 0.48 | 1.67 | 1.1 | Δ | o | o | x |
| Comp. Ex. 20 | XVI | B-9 | 1.0 | — | — | 2.4 | 0.48 | 1.67 | 0.6 | Δ | o | o | x |

EXAMPLES 37-41 AND COMPARATIVE EXAMPLES 21 and 22

The above prepared magnetic toners XIV and XV were blended with the negatively chargeable resin particles shown in Table 2 above, and hydrophobic silica particles shown in Table 11 above to prepare developers of these examples as shown in Table 13 below.

Each developer was charged in an image forming apparatus (LBP-8II, mfd. by Canon K.K.) remodelled to be equipped with a contact charging device as shown in FIG. 1 or FIG. 2. A DC voltage (−700 V) and an AC voltage (150 Hz, 1500 Vpp) were applied in superposition to the contact-charging device, and a successive image forming test was performed at a printing speed of 4 sheets (A4) per minute in a reversal development mode under normal temperature—normal humidity conditions (25° C., 60% RH), whereby the printed-out images were evaluated. The surface states of the charging member and the photosensitive drum were also observed. The charging member was a roller-type as shown in FIG. 1 in all the cases except that a blade-type as shown in FIG. 2 was used in Example 41.

The compositions of the developers and the evaluation results are summarized in Table 13 below.

TABLE 13

| Example No. | Magnetic toner 100 parts | Silica (part) | | Negatively chargable resin particles (part) | | Image density (initial) | Fog (initial) | Toner sticking (after 3000 sheets) |
|---|---|---|---|---|---|---|---|---|
| Ex. 37 | XIV | B-7 | 0.5 | A-1 | 0.1 | 1.4 | o | o |
| Ex. 38 | XIV | " | 0.5 | A-2 | 0.05 | 1.4 | o | o |
| Ex. 39 | XIV | " | 0.5 | A-3 | 0.1 | 1.4 | o | o |
| Ex. 40 | XV | B-8 | 0.4 | A-4 | 0.4 | 1.35 | o | o |
| Ex. 41 | XV | B-8 | 1.0 | A-5 | 0.8 | 1.3 | o | o |
| Comp. Ex. 21 | XIV | B-9 | 0.5 | A-6 | 0.2 | 1.0 | x | Δ |
| Comp. Ex. 22 | XIV | " | 0.5 | A-7 | 0.2 | 1.0 | o | x |

As described above, the developer according to the present invention can faithfully reproduce even thin lines of latent image formed on a photosensitive member, can maintain high quality images without depending on environmental conditions even in the case of continuous copying or printing, and can also provided good copy images without causing toner-sticking onto the photosensitive member even for a long period of successive copying.

What is claimed is:

1. An image forming apparatus, comprising:

a contact-charging means for charging a photosensitive member for bearing an electrostatic image while contacting the photosensitive member, and a developing means for developing an electrostatic image formed on the photosensitive member with a developer which comprises a toner, and negatively chargeable spherical resin particles having an average particle size of 0.03-1.0 micron and a volume resistivity of $10^6$-$10^{12}$ ohm.cm.

2. The apparatus according to claim 1, wherein said photosensitive member comprises an organic photoconductor layer and said contact-charging means is pressed against the photosensitive member at an abutting pressure of 5-500 g/cm.

3. The apparatus according to claim 1, wherein said contact-charging means is in the form of a roller comprising an electroconductive rubber layer and a releasable coating.

4. The apparatus according to claim 1, wherein said contact-charging means is equipped with a voltage application means for applying an AC voltage or/and a DC voltage.

5. The apparatus according to claim 1, wherein said contact charging means is equipped with a bias voltage application means for applying an AC voltage at 0.5-5 kVpp and 50-3000 Hz and a DC voltage of −200 to −900 volts.

6. The apparatus according to claim 1, wherein said developing means comprises a developing sleeve for carrying the developer.

7. The apparatus according to claim 1, wherein said photosensitive member is equipped with a cleaning means.

8. The apparatus according to claim 7, wherein said cleaning means comprises a cleaning blade.

9. The apparatus according to claim 3, wherein said electroconductive rubber layer has a thickness of 0.1-10 mm, and the releasable coating has a thickness of 5-30 microns.

10. The apparatus according to claim 3, wherein said electroconductive rubber layer comprises ethylene-propylene-diene terpolymer, and said releasable coating comprises nylon resin.

11. The apparatus according to claim 1, wherein said photosensitive member is surfaced with a resin selected from the group consisting of silicone resin, vinylidene chloride resin, ethylene-vinyl chloride resin, styrene-acrylonitrile resin, styrene-methyl methacrylate resin, styrene resin, polyethylene terephthalate resin and polycarbonate resin.

12. The apparatus according to claim 1, wherein said photosensitive member is surfaced with polycarbonate resin.

13. The apparatus according to claim 1, wherein said toner comprises toner particles and hydrophobic inorganic fine powder.

14. The apparatus according to claim 1, wherein said toner comprises toner particles and hydrophobic metal oxide fine powder.

15. The apparatus according to claim 1, wherein said toner comprises toner particles and hydrophobic silica fine powder.

16. The apparatus according to claim 1, wherein said toner comprises toner particles and hydrophobic inorganic fine powder treated with silicone oil or silicone varnish.

17. The apparatus according to claim 1, wherein said toner comprises toner particles having a volume-average particle size of 4-8 microns.

18. The apparatus according to claim 17, wherein said toner particles have a volume-average particle size of 6-8 microns.

19. The apparatus according to claim 1, wherein said toner comprises magnetic toner particles.

20. The apparatus according to claim 1, wherein said negatively chargeable spherical resin particles have a triboelectric charge of $-50$ to $-170$ $\mu C/g$.

21. The apparatus according to claim 1, wherein said developer contains 0.01-1.0 wt. part of the negatively chargeable spherical resin particles and 0.1-3.0 wt. parts of hydrophobic inorganic fine powder per 100 wt. parts of toner particles constituting the toner.

22. The apparatus according to claim 21, wherein said hydrophobic inorganic fine powder is contained in a larger production than the negatively chargeable spherical resin particles.

23. The apparatus according to claim 22, wherein 0.2-2.0 wt. parts of the hydrophobic inorganic fine powder is mixed with 100 wt. parts of the toner particles.

24. The apparatus according to claim 22, wherein 0.6-1.6 wt. parts of the hydrophobic inorganic fine powder is mixed with 100 wt. parts of the toner particles.

25. The apparatus according to claim 1, wherein said toner comprises toner particles, hydrophobic inorganic fine powder and aliphatic acid metal salt fine powder.

26. The apparatus according to claim 25, wherein said aliphatic acid metal salt fine powder has a positive chargeability and a primary average particle size of 1 micron or smaller.

27. The apparatus according to claim 25, which wherein said developer contains 0.01-1.0 wt. part of the negatively chargeable spherical resin particles, 0.1-3.0 wt. parts of the inorganic fine powder treated with silicone oil or silicone varnish, and 0.05-0.7 wt. part of the aliphatic acid metal salt fine powder per 100 wt. parts of the toner particles.

28. The apparatus according to claim 25, wherein the amount of the hydrophobic inorganic fine powder is larger than the total amount of the negatively chargeable spherical resin particles and the aliphatic acid metal salt and is also larger than 4 times the amount of the aliphatic acid metal salt.

29. The apparatus according to claim 1, wherein said toner comprises toner particles containing a binder resin which comprises 3-30 wt. parts of polymerized monomer units having an acid group formed of a carboxyl group or its anhydride per 100 wt. parts of the binder resin and has an acid value of 1-70.

30. The apparatus according to claim 29, wherein said toner comprises magnetic toner particles.

31. The apparatus according to claim 29, wherein said toner particles have a volume-average particle size of 4-8 microns.

32. The apparatus according to claim 30, wherein said magnetic toner particles have a volume-average particle size of 6-8 microns; the developer has a BET specific surface area of 1.8-3.5 $m^2/g$, a loose apparent density of 0.4-0.29 $g/cm^3$; and a true density of 1.22-1.8 $g/cm^3$; and 100 parts of the magnetic toner particles are mixed with 0.01-1.0 wt. part of the negatively chargeable spherical resin particles having an average particle size of 0.03-1.0 microns, a volume resistivity of $10^6$-$10^2$ ohm.cm and a triboelectric charge of $-50$ to $-170$ $\mu C/g$ and 0.6-1.6 wt. parts of the hydrophobic inorganic fine powder treated with silicone oil or silicone varnish.

33. The apparatus according to claim 32, wherein said hydrophobic inorganic fine powder is contained in a larger production than the negatively chargeable spherical resin particles.

34. The apparatus according to claim 1, wherein said negatively chargeable spherical resin particles have a primary average particle size of 0.05-0.8 micron.

35. The apparatus according to claim 1, wherein said negatively chargeable spherical resin particles comprise a polymer or copolymer obtained by polymerizing a vinyl monomer selected from the group consisting of styrene, acrylic acid, methyl methacrylate, butyl acrylate, 2-ethylhexyl acrylate and mixtures thereof.

36. An apparatus unit comprising: a photosensitive member; a contact charging means, a developing means for developing an electrostatic image formed on the photosensitive member with a developer which comprises a toner, and negatively chargeable spherical resin particles having an average particle size of 0.03-1.0 micron and a volume resistivity of $10^6$-$10^{12}$ ohm.cm;

wherein at least one of said contact-charging means and developing means is supported integrally together with said photosensitive member to form a single unit, which can be connected to or released from an apparatus body as desired.

37. The apparatus unit according to claim 36, wherein said photosensitive member comprises an organic photoconductor layer and said contact-charging means is pressed against the photosensitive member at an abutting pressure of 5-500 g/cm.

38. The apparatus unit according to claim 36, wherein said contact-charging means is in the form of a roller comprising an electroconductive rubber layer and a releasable coating.

39. The apparatus unit according to claim 36, wherein said contact-charging means is equipped with a voltage application means for applying an AC voltage or/and a DC voltage.

40. The apparatus unit according to claim 36, wherein said contact charging means is equipped with a bias voltage application means for applying an AC voltage at 0.5-5 kVpp and 50-3000 Hz and a DC voltage of −200 to −900 volts.

41. The apparatus unit according to claim 36, wherein said developing means comprises a developing sleeve for carrying the developer.

42. The apparatus unit according to claim 36, wherein said photosensitive member is equipped with a cleaning means.

43. The apparatus unit according to claim 42, wherein said cleaning means comprises a cleaning blade.

44. The apparatus unit according to claim 42, wherein said electroconductive rubber layer has a thickness of 0.1-10 mm, and the releasable coating has a thickness of 5-30 microns.

45. The apparatus unit according to claim 42, wherein said electroconductive rubber layer comprises ethylene-propylene-diene terpolymer, and said releasable coating comprises nylon resin.

46. The apparatus unit according to claim 36, wherein said photosensitive member is surfaced with a resin selected from the group consisting of silicone resin, vinylidene chloride resin, ethylene-vinyl chloride resin, styrene-acrylonitrile resin, styrene-methyl methacrylate resin, styrene resin, polyethylene terephthalate resin and polycarbonate resin.

47. The apparatus unit according to claim 36, wherein said photosensitive member is surfaced with polycarbonate resin.

48. A facsimile apparatus, comprising: an electrophotographic apparatus and a receiving means for receiving image data from a remote terminal, wherein said electrophotographic apparatus comprises:

a contact-charging means for charging a photosensitive member for bearing an electrostatic image while contacting the photosensitive member, and a developing means for developing an electrostatic image formed on the photosensitive member with a developer which comprises a toner, and negatively chargeable spherical resin particles having an average particle size of 0.03-1.0 micron and a volume resistivity of $10^6$-$10^{12}$ ohm.cm.

49. The facsimile apparatus according to claim 48, wherein said electrophotographic apparatus comprises an apparatus according to any one of claims 2 to 35.

50. The facsimile apparatus according to claim 48, wherein said photosensitive member comprises an organic photoconductor layer and said contact-charging means is pressed against the photosensitive member at an abutting pressure of 5-500 g/cm.

51. The facsimile apparatus according to claim 48, wherein said contact-charging means is in the form of a roller comprising an electroconductive rubber layer and a releasable coating.

52. The facsimile apparatus according to claim 48, wherein said contact-charging means is provided with a voltage application means for applying an AC voltage or/and a DC voltage.

53. The facsimile apparatus according to claim 48, wherein said contact-charging means is provided with a bias voltage application means for applying an AC voltage at 0.5-5 kVpp and 50-3000 Hz and a DC voltage of −200 to −900 volts.

54. The facsimile apparatus according to claim 48, wherein said developing means comprises a developing sleeve for carrying the developer.

55. The facsimile apparatus according to claim 48, wherein said photosensitive member is provided with a cleaning means.

56. The facsimile apparatus according to claim 55, wherein said cleaning means comprises a cleaning blade.

57. The facsimile apparatus according to claim 51, wherein said electroconductive rubber layer has a thickness of 0.1 -10 mm, and the releasable coating has a thickness of 5-30 microns.

58. The facsimile apparatus according to claim 51, wherein said electroconductive rubber layer comprises ethylene-propylene-diene terpolymer, and said releasable coating comprises nylon resin.

59. The facsimile apparatus according to claim 48, wherein said photosensitive member is surfaced with a resin selected from the group consisting of silicone resin, vinylidene chloride resin, ethylene-vinyl chloride resin, styrene-acrylontirile resin, styrene-methyl methacrylate resin, styrene resin, polyethylene terephthalate resin and polycarbonate resin.

60. The facsimile apparatus according to claim 48, wherein said photosensitive member is surfaced with a polycarbonate resin.

61. The facsimile apparatus according to claim 48, wherein said toner comprises toner particles and hydrophobic inorganic fine powder.

62. The facsimile apparatus according to claim 48, wherein said toner comprises toner particles and hydrophobic metal oxide fine powder.

63. The facsimile apparatus according to claim 48, wherein said toner comprises toner particles and hydrophobic silica fine powder.

64. The facsimile apparatus according to claim 48, wherein said toner comprises toner particles and hydrophobic inorganic fine powder treated with silicone oil or silicone varnish.

65. The facsimile apparatus according to claim 48, wherein said toner comprises toner particles having a volume-average particle size of 4-8 microns.

66. The facsimile apparatus according to claim 48, wherein said toner particles have a volume-average particle size of 6-8 microns.

67. The facsimile apparatus according to claim 48, wherein said toner comprises magnetic toner particles.

68. The facsimile apparatus according to claim 48, wherein said negatively chargeable spherical resin particles have a triboelectric charge of −50 to −400 μC/g.

69. The facsimile apparatus according to claim 48, wherein said developer contains 0.01-1.0 wt. part of the negatively chargeable spherical resin particles and 0.1-3.0 wt. parts of hydrophobic inorganic fine powder per 100 wt. parts of toner particles constituting the toner.

70. The facsimile apparatus according to claim 69, wherein said hydrophobic inorganic fine powder is contained in a larger production than the negatively chargeable spherical resin particles.

71. The facsimile apparatus according to claim 70, wherein 0.2-2.0 wt. parts of the hydrophobic inorganic fine powder is mixed with 100 wt. parts of the toner particles.

72. The facsimile apparatus according to claim 70, wherein 0.6–1.6 wt. parts of the hydrophobic inorganic fine powder is mixed with 100 wt. parts of the toner particles.

73. The facsimile apparatus according to claim 48, wherein said toner comprises tone particles, hydrophobic inorganic fine powder and aliphatic acid metal salt fine powder.

74. The facsimile apparatus according to claim 73, wherein said aliphatic acid metal salt fine powder has a positive chargeability and a primary average particle size of 1 micron or smaller.

75. The facsimile apparatus according to claim 73, which comprises 0.01–1.0 wt. part of the negatively chargeable spherical resin particles, 0.1–3.0 wt. parts of the fine powder treated with silicone oil or silicone varnish, and 0.5–0.7 wt. part of the aliphatic acid metal salt fine powder per 100 wt. parts of the toner particles.

76. The facsimile apparatus according to claim 73, wherein the amount of the hydrophobic inorganic fine powder is larger than the total amount of the negatively chargeable spherical resin particles and the aliphatic acid metal salt and is also larger than 4 times the amount of the aliphatic acid metal salt.

77. The facsimile apparatus according to claim 48, wherein said toner comprises toner particles containing a binder resin which comprises 3–30 wt. parts of polymerized monomer units having an acid group formed of a carboxyl group or its anhydride per 100 wt. parts of the binder resin and has an acid value of 1–70.

78. The facsimile apparatus according to claim 77, wherein said toner comprises magnetic toner particles.

79. The facsimile apparatus according to claim 77, wherein said toner particles have a volume-average particle size of 4–8 microns 80. The facsimile apparatus according to claim 78, wherein said toner particles have a volume-average particle size of 6–8 microns; the developer has a BET specific surface area of 1.8–3.5 $m^2/g$, a loose apparent density of 0.4–0.52 $g/cm^3$, and a true density of 1.45–1.8 $g/cm^3$; and 100 parts of the magnetic toner particles are mixed with 0.01–1.0 wt. part of the negatively chargeable spherical resin particles having an average particle size of 0.03–1.0 micron, a volume resistivity of $10^6$–$10^{12}$ ohm.cm and a triboelectric charge of $-50$ to $-400$ $\mu C/g$ and 0.6–1.6 wt. parts of the hydrophobic inorganic fine powder treated with silicone oil or silicone varnish.

81. The facsimile apparatus according to claim 80, wherein said hydrophobic inorganic fine powder is contained in a larger production than the negatively chargeable spherical resin particles.

82. The facsimile apparatus according to claim 48, wherein said negatively chargeable spherical resin particles have a primary average particle size of 0.05–0.8 micron.

83. The facsimile apparatus according to claim 48, wherein said negatively chargeable spherical resin particles comprises a polymer or copolymer obtained by polymerizing a vinyl monomer selected from the group consisting of styrene, acrylic acid, methyl methacrylate, butyl acrylate, 2-ethylhexyl acrylate and mixtures thereof.

* * * * *

UNITED STATES PATENT AND TRADEMARK OFFICE

CERTIFICATE OF CORRECTION

PATENT NO. : 5,210,617

DATED : May 11, 1993

INVENTOR(S) : KOICHI TOMIYAMA, ET AL.

It is certified that error appears in the above-identified patent and that said Letters Patent is hereby corrected as shown below:

COLUMN 1

Line 28, "use" (second occurrence) should be deleted.
Line 66, "nonuniform-" should read --nonuniformly,--.
Line 67, "ity," should be deleted.

COLUMN 2

Line 13, "weight" should read --weight.--.

COLUMN 3

Line 42, "invention" should read --invention is--.

COLUMN 6

Line 28, "specifically;" should read --specifically,--.

COLUMN 7

Line 56, "$(g/cm^3)=W/]\pi\times(D/2)^2\times L]$" should read --$(g/cm^3)=W/[\pi\times(D/2)^2\times L]$--.

COLUMN 9

Line 14, "2.0" should read --2.0%--.
Line 41, "Form" should read --From--.

COLUMN 11

Line 12, "H" should be deleted.
Line 14, "$1\times10^4$," should read --.$1\times10^4$,--.
Line 49, "3-30 wt." should read --3-30 wt. %--.

UNITED STATES PATENT AND TRADEMARK OFFICE

CERTIFICATE OF CORRECTION

PATENT NO. : 5,210,617

DATED : May 11, 1993

INVENTOR(S) : KOICHI TOMIYAMA, ET AL.

It is certified that error appears in the above-identified patent and that said Letters Patent is hereby corrected as shown below:

COLUMN 15

Line 21, "hydrophobil-" should read --hydrophobic- --.
Line 24, "60" should read --60%--.
Line 32, "silicon" should read --silicone--.
Line 55, "silicon" should read --silicone--.

COLUMN 17

Line 25, "incorporated" should read --incorporate--.
Line 60, "n" should read --in--.

COLUMN 18

Line 12, "prescribed" should read --prescribed voltage--.
Line 41, "micronthick" should read --micron thick--.

COLUMN 23

Line 41, "coarse power" should read --coarse powder--.

COLUMN 24

Line 7, "show" should read --shown--.

COLUMN 27

Line 55, "(Tg = 57°)" should read --(Tg = 57°C.)--.

COLUMN 32

Line 32, "coarse power" should read --coarse powder--.

UNITED STATES PATENT AND TRADEMARK OFFICE
CERTIFICATE OF CORRECTION

PATENT NO. : 5,210,617
DATED : May 11, 1993
INVENTOR(S) : KOICHI TOMIYAMA, ET AL.

It is certified that error appears in the above-identified patent and that said Letters Patent is hereby corrected as shown below:

COLUMN 35

Line 63, "provided" should read --provide--.

COLUMN 37

Line 48, "production" should read --proportion--.
Line 65, "which" should be deleted.

COLUMN 38

Line 25, "1.22" should read --1.45--.

COLUMN 40

Line 63, "production" should read --proportion--.

COLUMN 42

Line 3, "microns" should read --microns.--.

Signed and Sealed this

Fifth Day of April, 1994

Attest:

BRUCE LEHMAN

*Attesting Officer*

*Commissioner of Patents and Trademarks*